(12) United States Patent
Ono

(10) Patent No.: US 11,588,427 B2
(45) Date of Patent: Feb. 21, 2023

(54) MOTOR DRIVE DEVICE AND AIR CONDITIONER

(71) Applicant: Mitsubishi Electric Corporation, Tokyo (JP)

(72) Inventor: Yoshihito Ono, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 17/298,181

(22) PCT Filed: Feb. 28, 2019

(86) PCT No.: PCT/JP2019/007881
§ 371 (c)(1),
(2) Date: May 28, 2021

(87) PCT Pub. No.: WO2020/174671
PCT Pub. Date: Sep. 3, 2020

(65) Prior Publication Data
US 2022/0103107 A1 Mar. 31, 2022

(51) Int. Cl.
*H02P 23/14* (2006.01)
*H02P 27/06* (2006.01)
*F25B 31/02* (2006.01)

(52) U.S. Cl.
CPC ............ *H02P 23/14* (2013.01); *F25B 31/02* (2013.01); *H02P 27/06* (2013.01)

(58) Field of Classification Search
CPC .......... H02P 23/14; H02P 27/06; F25B 31/02

USPC ........................................................ 318/455
See application file for complete search history.

(56) References Cited

U.S. PATENT DOCUMENTS

| 8,768,187 | B2 | 7/2014 | Sato |
| 9,122,224 | B2 | 9/2015 | Sato |
| 10,700,626 | B2 | 6/2020 | Ono |
| 10,910,982 | B2 | 2/2021 | Ono |
| 2013/0079992 | A1* | 3/2013 | Nakajima ............... B62D 5/065 701/42 |
| 2017/0183057 | A1* | 6/2017 | Gibbings ............... B62K 19/40 |
| 2018/0183376 | A1* | 6/2018 | Ono .......................... H02P 6/00 |

FOREIGN PATENT DOCUMENTS

| EP | 2 903 150 A1 | 8/2015 |
| JP | 2012-120409 A | 6/2012 |
| JP | 2012-130164 A | 7/2012 |

(Continued)

*Primary Examiner* — Kawing Chan
(74) *Attorney, Agent, or Firm* — Posz Law Group, PLC

(57) ABSTRACT

A motor drive device includes an inverter output unit that drives a motor using electrical power supplied from a supply power generation unit, a voltage detection unit that detects a voltage value of a DC voltage, a current detection unit, a current limiting resistor and a current change-over switch connected in parallel between a bus and the voltage detection unit, and a motor drive control unit that controls the inverter output unit based on the voltage value and controls turning on and off of the current change-over switch based on the current value. The motor drive control unit turns on the current change-over switch when the motor is to be driven, and turns off the current change-over switch when the current value changes only by an amount less than a first threshold in a first time period during driving of the motor.

12 Claims, 16 Drawing Sheets

(56) References Cited

FOREIGN PATENT DOCUMENTS

| | | | |
|---|---|---|---|
| JP | 2014-081193 A | 5/2014 | |
| WO | 2017/068628 A1 | 4/2017 | |
| WO | WO-2017068628 A1 * | 4/2017 | .............. H02P 27/06 |

\* cited by examiner

MOTOR DRIVE DEVICE AND AIR CONDITIONER

CROSS REFERENCE TO RELATED APPLICATION

This application is a U.S. national stage application of International Patent Application No. PCT/JP2019/007881 filed on Feb. 28, 2019, the disclosure of which is incorporated herein by reference.

TECHNICAL FIELD

The present invention relates to a motor drive device and to an air conditioner that control driving of a motor.

BACKGROUND

Among motor drive devices that drive a motor, there is a device including an inverter that converts direct current (DC) power into alternating current (AC) power, and supplies the AC power to a motor, and an inverter control device that controls operation of the inverter. This type of motor drive device is desired to drive a motor stably. To drive a motor stably, the motor drive device described in Patent Literature 1 monitors the DC voltage during motor driving, and feeds back the result of monitoring to controlling of the motor.

PATENT LITERATURE

Patent Literature 1: Japanese Patent Application Laid-open No. 2012-120409

However, due to continuous operation of the voltage detection circuit and of the inverter control device even when the motor is not in operation, the foregoing technology of Patent Literature 1 leads to unnecessary consumption of electricity when the motor is not in operation. This presents a problem of increased power consumption.

SUMMARY

The present invention has been made in view of the foregoing, and it is an object of the present invention to provide a motor drive device that can reduce power consumption.

A motor drive device of an aspect of the present invention includes a supply power generation unit that converts electrical power supplied from a commercial power supply into direct current electrical power, an inverter output unit that drives a motor using the electrical power supplied from the supply power generation unit, and a voltage detection unit that detects a voltage value of a direct current voltage being applied to the inverter output unit by the supply power generation unit. The motor drive device of the aspect of the present invention also includes a current detection unit that detects a current value of a current being supplied from the inverter output unit to the motor; a current limiting resistor and a current change-over switch connected in parallel between a bus and the voltage detection unit, the bus connecting the supply power generation unit and the inverter output unit to each other, wherein the current change-over switch switches a short circuit path between both ends of the current limiting resistor to either an ON state or an OFF state; and a motor drive control unit that controls the inverter output unit based on a detection result of the voltage detection unit, and controls turning on and off of the current change-over switch based on the current value. The motor drive control unit applies a voltage of the bus to the voltage detection unit through the current change-over switch by turning on the current change-over switch when the motor is to be driven, and applies the voltage of the bus to the voltage detection unit, not through the current change-over switch, but through the current limiting resistor, by turning off the current change-over switch when the current value changes only by an amount less than a first threshold in a first time period during driving of the motor.

The motor drive device according to the present invention provides an advantage in being capable of reducing power consumption.

DETAILED DESCRIPTION

A motor drive device and an air conditioner according to embodiments of the present invention will be described in detail below with reference to the drawings. Note that these embodiments are not intended to limit this invention.

First Embodiment

Figure 1:
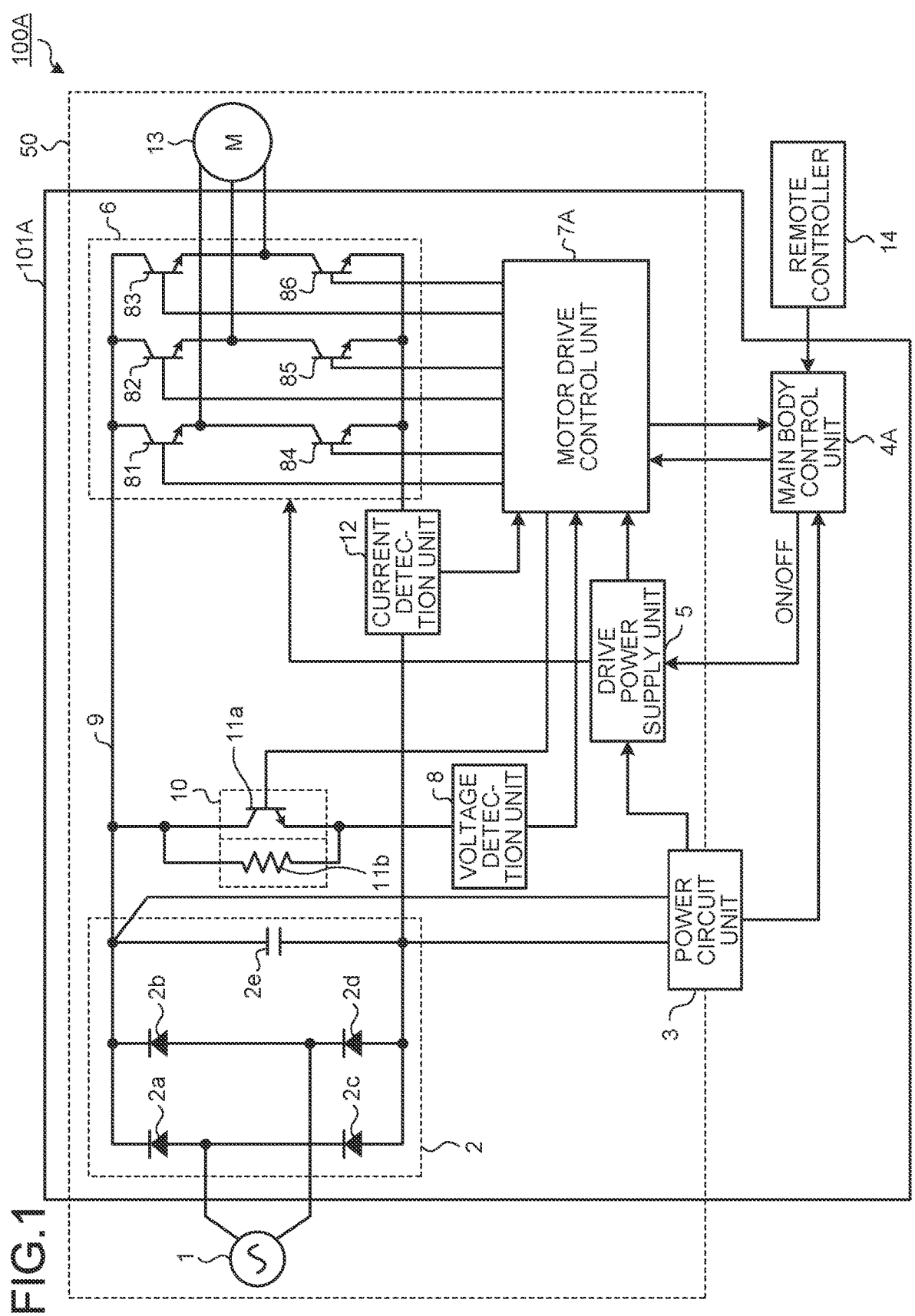
FIG. 1 is a diagram illustrating a first configuration example of a motor drive system including a motor drive device according to a first embodiment.

FIG. 1 is a diagram illustrating a first configuration example of a motor drive system including a motor drive device according to a first embodiment. A motor drive system 100A according to the first embodiment includes a motor drive device 101A, a motor 13, and a remote controller (hereinafter referred to as remote controller) 14.

The motor drive device 101A is a device for driving the motor 13 under supply of alternating current (AC) power from a commercial power supply 1. The motor drive device 101A includes a supply power generation unit 2, a power circuit unit 3, a main body control unit 4A, a drive power supply unit 5, an inverter output unit 6 including an inverter circuit, a motor drive control unit 7A, a current detection unit 12, a voltage detection unit 8, and a switch unit 10.

The supply power generation unit 2 is connected to the commercial power supply 1. The supply power generation unit 2 includes diodes 2a to 2d connected to one another in a bridge configuration, and a smoothing capacitor 2e subjected to a direct current (DC) voltage obtained by conversion provided by the diodes 2a to 2d. The supply power generation unit 2 converts the AC voltage applied from the commercial power supply 1 into a DC voltage to generate drive power for driving the motor 13.

The supply power generation unit 2 has an input side thereof being connected to the commercial power supply 1, and has an output side thereof being connected to the power circuit unit 3, to the switch unit 10, to the voltage detection unit 8, to the current detection unit 12, and to the inverter output unit 6 via the bus 9. The supply power generation unit 2 converts the AC power supplied from the commercial power supply 1 into DC power, and supplies the DC power to the power circuit unit 3 and to the inverter output unit 6.

The power circuit unit 3 is connected to the main body control unit 4A and to the drive power supply unit 5. The power circuit unit 3 generates operational power using the electrical power generated by the supply power generation unit 2, and supplies the operational power generated, to the main body control unit 4A and to the drive power supply unit 5.

The drive power supply unit 5 is connected to the main body control unit 4A, to the inverter output unit 6, and to the motor drive control unit 7A. The drive power supply unit 5 supplies operational power to each of the inverter output unit 6 and the motor drive control unit 7A using the electrical power supplied from the power circuit unit 3.

The main body control unit 4A controls the entire portion of the motor drive device 101A. The main body control unit 4A controls the drive power supply unit 5 and the motor drive control unit 7A. The main body control unit 4A controls the drive power supply unit 5 to either an ON state or an OFF state according to an instruction from the remote controller 14.

Turning on of the drive power supply unit 5 by the main body control unit 4A, causes the drive power supply unit 5 to start supplying power to the inverter output unit 6 and to the motor drive control unit 7A, while turning off of the drive power supply unit 5 by the main body control unit 4A causes the drive power supply unit 5 to stop supplying power to the inverter output unit 6 and to the motor drive control unit 7A. The main body control unit 4A thus controls supply and non-supply of electrical power from the drive power supply unit 5 to the inverter output unit 6 and to the motor drive control unit 7A. The main body control unit 4A is connected to the motor drive control unit 7A also via a communication line, which allows mutual bidirectional communication with the motor drive control unit 7A.

The voltage detection unit 8 is a voltage detection circuit, and detects the voltage of the bus 9 electrically connecting the supply power generation unit 2 and the inverter output unit 6 to each other, i.e., the DC voltage being applied to the inverter output unit 6 by the supply power generation unit 2. The voltage detection unit 8 transmits a voltage value, which is the detection result, to the motor drive control unit 7A.

The switch unit 10 is connected between the voltage detection unit 8 and the bus 9. The switch unit 10 includes a current change-over switch 11a and a current limiting resistor 11b, connected in parallel between the voltage detection unit 8 and the bus 9. The current change-over switch 11a switches a short circuit path between both ends of the current limiting resistor 11b to either an ON state or an OFF state. The current change-over switch 11a is connected to the motor drive control unit 7A, and is controlled by the motor drive control unit 7A.

The inverter output unit 6 includes switching devices 81 to 86. The switching devices 81 to 83 are the switching devices of an upper arm, and the switching devices 84 to 86 are the switching devices of a lower arm. The switching device 81 of the upper arm and the switching device 84 of the lower arm are connected in series with each other to form a switching device pair of U-phase. Similarly, the switching device 82 of the upper arm and the switching device 85 of the lower arm are connected in series with each other to form a switching device pair of V-phase, and the switching device 83 of the upper arm and the switching device 86 of the lower arm are connected in series with each other to form a switching device pair of W-phase.

The connection point between the switching devices 81 and 84, the connection point between the switching devices 82 and 85, and the connection point between the switching devices 83 and 86 are connected to the motor 13. In the inverter output unit 6, the switching devices 81 to 86 are also connected to the current detection unit 12.

The current detection unit 12 is connected between the supply power generation unit 2 and the motor drive control unit 7A to detect the current flowing from the supply power generation unit 2 to the inverter output unit 6. The current detection unit 12 transmits the current value detected, to the motor drive control unit 7A.

The motor drive control unit 7A, which is an inverter control device, outputs a signal for driving the motor 13 to the inverter output unit 6 to control the inverter output unit 6. The motor drive control unit 7A controls the inverter output unit 6 based on the voltage value detected by the voltage detection unit 8, and controls the current change-over switch 11a based on the current value detected by the current detection unit 12.

Note that a broken line 50 in FIG. 1 indicates the boundary present in a configuration that allows the secondary part to be electrically insulated (hereinafter, simply insulated) from the primary part, assuming that the primary part is the part electrically connected to the commercial power supply 1, while the secondary part is the part where the main body control unit 4A is provided. A configuration that allows the secondary part of an air conditioner to be insulated from the primary part thereof (hereinafter referred to as insulated configuration) will be described later herein.

Figure 2:
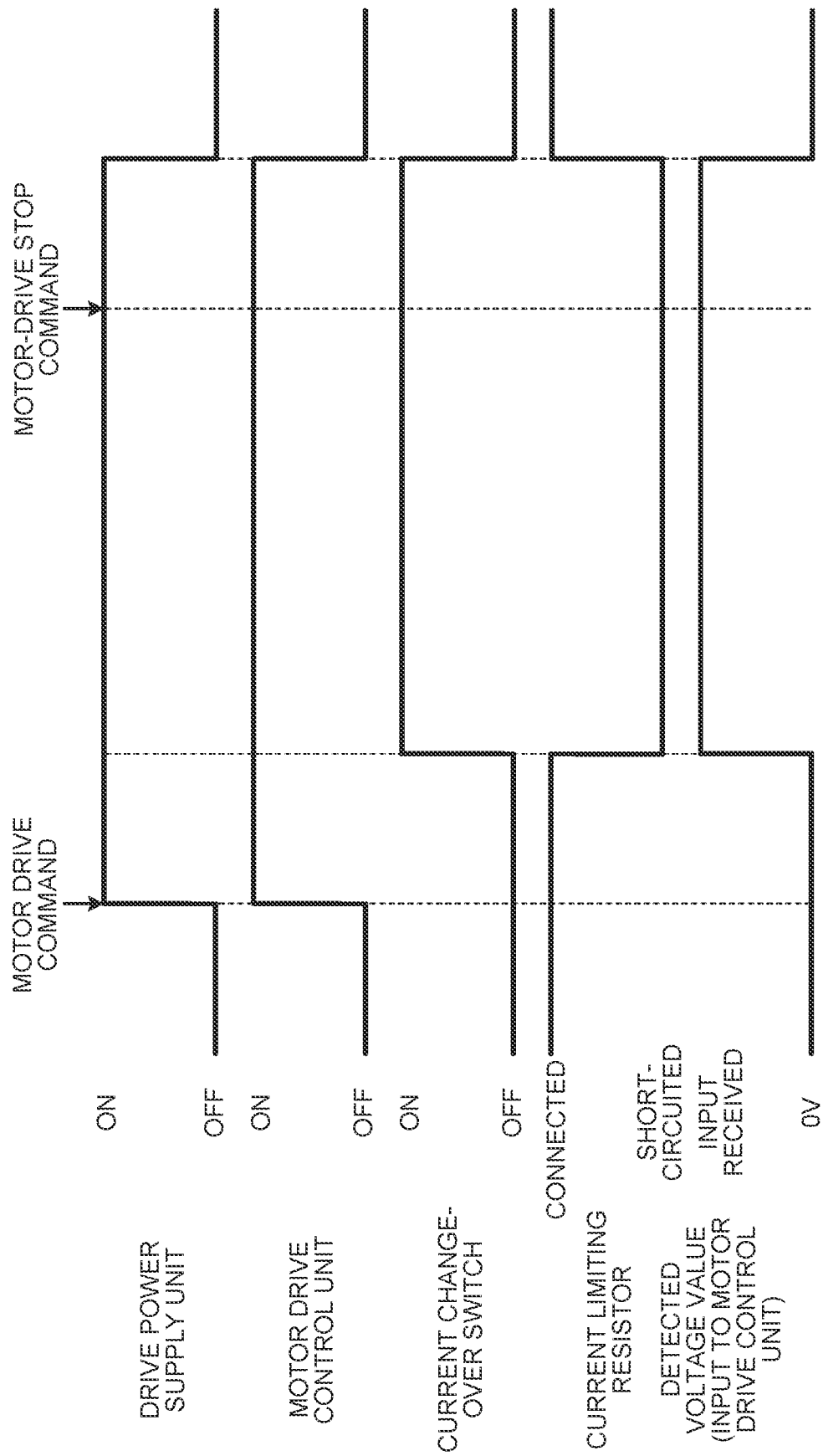
FIG. 2 is a diagram illustrating operational timing of the motor drive device according to the first embodiment.

Operational timing of the motor drive device 101A when the motor drive device 101A drives the motor 13 will next be described. FIG. 2 is a diagram illustrating operational timing of the motor drive device according to the first embodiment.

Connection of the commercial power supply 1 to the supply power generation unit 2 causes the supply power generation unit 2 to generate a DC voltage, supply the DC voltage generated to the power circuit unit 3, and supply the DC voltage to the inverter output unit 6 via the bus 9. Upon reception of the DC voltage, the power circuit unit 3 supplies the voltage to each of the main body control unit 4A and the drive power supply unit 5.

Upon reception of a motor drive command from the remote controller 14, the main body control unit 4A turns on the drive power supply unit 5, and accordingly, also turns on the motor drive control unit 7A. After a specific time period has elapsed, the motor drive control unit 7A turns on the current change-over switch 11*a*. Turning on of the current change-over switch 11*a* causes the current limiting resistor 11*b*, disposed between the supply power generation unit 2 and the voltage detection unit 8, to be short-circuited by the current change-over switch 11*a*, thereby causing the voltage of the bus 9 to be transmitted to the voltage detection unit 8 through the current change-over switch 11*a*. This enables the voltage detection unit 8 to detect the value of the voltage of the bus 9. Meanwhile, turning off of the current change-over switch 11*a* causes the voltage of the bus 9 to be transmitted to the voltage detection unit 8 through the current limiting resistor 11*b*, not through the current change-over switch 11*a*. This reduces the power consumption of the voltage detection unit 8.

Fluctuation of the voltage of the bus 9 causes the rotation of the motor 13 to fluctuate depending on the voltage. Thus, to stably drive the motor 13, the voltage of the bus 9 needs to be detected. The voltage detection unit 8 inputs the voltage value detected, into the motor drive control unit 7A. In addition, after the motor 13 starts to operate, the current detection unit 12 detects the current flowing to the motor 13, and inputs a current value, which is the detection result, into the motor drive control unit 7A.

When motor driving is to be stopped, the main body control unit 4A receives a motor-drive stop command from the remote controller 14, and after a specific time period has elapsed, turns off the drive power supply unit 5. At the same time, the motor drive control unit 7A and the current change-over switch 11*a* are turned off, thereby causing the current limiting resistor 11*b* to be connected between the supply power generation unit 2 and the voltage detection unit 8.

Note that although it is assumed here that the current change-over switch 11*a* is turned on after a specific time period has elapsed since the motor drive control unit 7A was turned on, the current change-over switch 11*a* may be turned on simultaneously with turning on of the drive power supply unit 5 and of the motor drive control unit 7A. In addition, it is assumed here that, after stopping of motor driving, the current change-over switch 11*a* is turned off simultaneously with turning off of the drive power supply unit 5, but the current change-over switch 11*a* may be turned off before the drive power supply unit 5 is turned off. In this case, the main body control unit 4A notifies the motor drive control unit 7A of stopping of motor driving. Upon reception of the notification indicating stopping of motor driving, the motor drive control unit 7A turns off the current change-over switch 11*a*. The drive power supply unit 5 may be turned off immediately after the main body control unit 4A received the motor-drive stop command.

Figure 3:
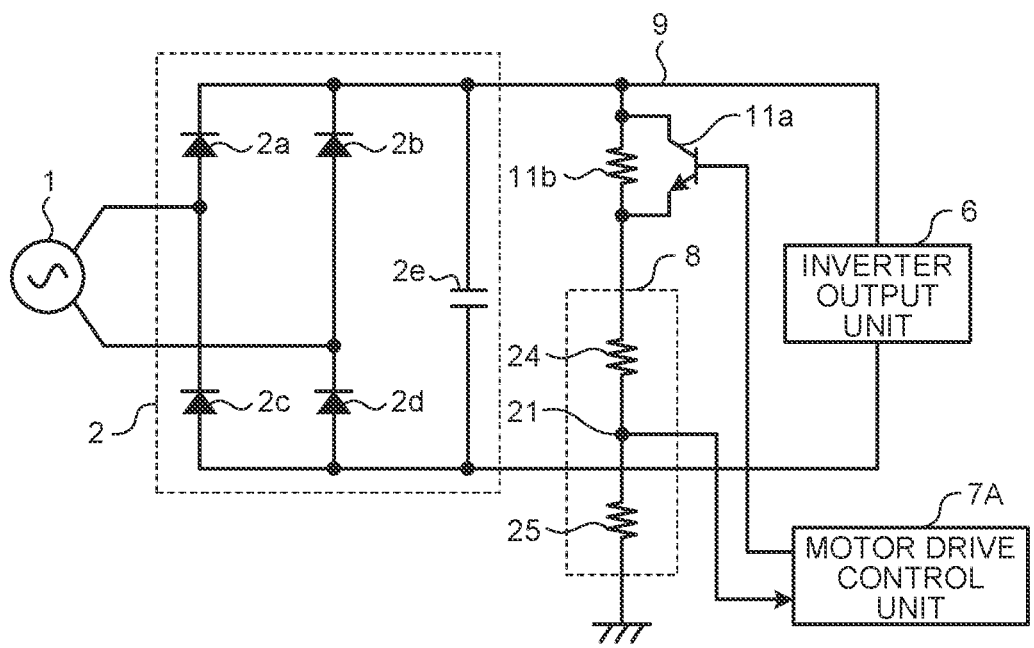
FIG. 3 is a diagram illustrating a configuration of the voltage detection unit included in the motor drive device according to the first embodiment.

A configuration and an operation of the voltage detection unit 8 will now be described in detail. FIG. 3 is a diagram illustrating a configuration of the voltage detection unit included in the motor drive device according to the first embodiment. The voltage detection unit 8 includes voltage-dividing resistors 24 and 25 connected in series with each other. The voltage-dividing resistor 24 has one end connected to the current change-over switch 11*a* and to the current limiting resistor 11*b*, and another end connected to the voltage-dividing resistor 25 via a connection point 21. The voltage-dividing resistor 25 has one end connected to the voltage-dividing resistor 24 via the connection point 21, and another end being grounded.

During motor driving, short-circuiting of the current limiting resistor 11*b* by the current change-over switch 11*a* causes the voltage detection unit 8 to divide the DC voltage generated by the supply power generation unit 2 into voltages corresponding to the voltage-dividing resistor 24 and to the voltage-dividing resistor 25, and to input the voltage resulting from the voltage division to the motor drive control unit 7A. The voltage of the bus 9 is thus detected.

A use application of the voltage value detected (detection result) by the voltage detection unit 8 will next be described. The motor drive control unit 7A controls the inverter output unit 6 to adjust the amount of current to flow to the motor 13 based on the detection result of the voltage value and on an instruction on a target rotational speed from the main body control unit 4A. The current flowed to the motor 13 is detected by the current detection unit 12, and the current value, which is the detection result, is input into the motor drive control unit 7A. When the rotational speed of the motor 13 reaches the target rotational speed, and the rotational speed has stabilized, the current flowing to the motor 13 becomes constant. Even when the voltage of the bus 9 fluctuates, the motor drive control unit 7A having received a voltage value from the voltage detection unit 8 controls the inverter output unit 6 based on the voltage value to maintain the current flowing to the motor 13 at a constant level. This can stabilize the rotational speed of the motor 13.

Control for stabilizing the rotational speed of the motor 13 requires knowing of the value of the voltage of the bus 9. However, there is no need to know the value of the voltage of the bus 9 when the motor 13 has been stopped. Thus, detection of the value of the voltage by the voltage detection unit 8 when the motor 13 has been stopped will lead to unnecessary consumption of electricity. In addition, when the rotational speed of the motor 13 is stable and the voltage of the bus 9 is stable, providing constant control on the inverter output unit 6 by the motor drive control unit 7A also eliminates the need for detecting the value of the voltage of the bus 9. In the first embodiment, when no need exists to detect the value of the voltage of the bus 9, the current change-over switch 11*a* is turned off to allow a current to flow to the voltage detection unit 8 through the current limiting resistor 11*b* to reduce power consumption.

Figure 4:
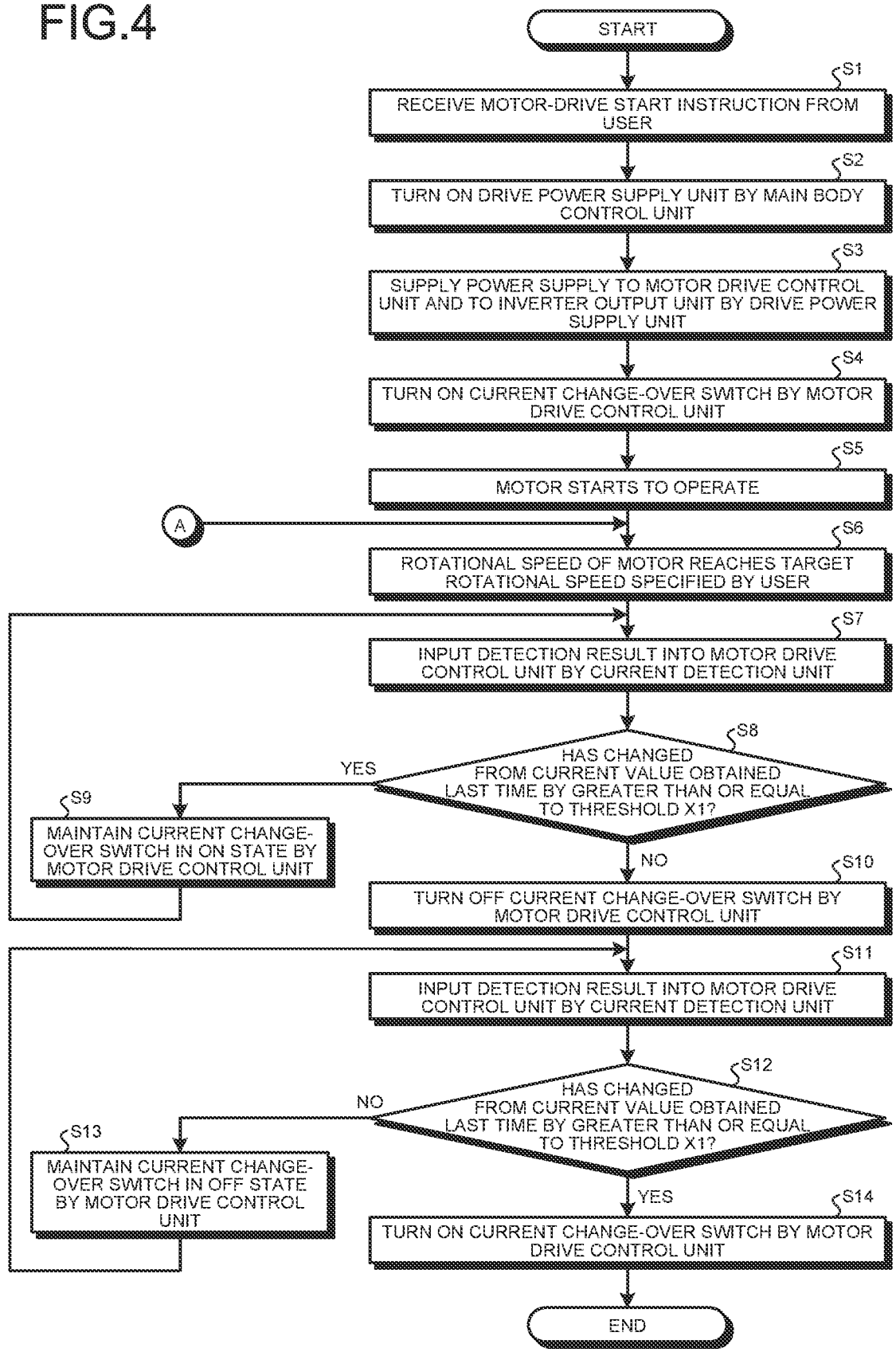
FIG. 4 is a flowchart illustrating an operation processing procedure of the motor drive device in the first configuration example according to the first embodiment.

FIG. 4 is a flowchart illustrating an operation processing procedure of the motor drive device in the first configuration example according to the first embodiment. When the motor 13 is not being driven, the motor drive control unit 7A is not supplied with operational power (supply power) from the drive power supply unit 5, and is thus not in operation. Due to the non-operational state of the motor drive control unit 7A, the current change-over switch 11a has also been turned off, thereby causing a current to flow to the voltage detection unit 8 through the current limiting resistor 11b.

An input from the user of an instruction to start motor driving (hereinafter, motor-drive start instruction) into the remote controller 14 causes the remote controller 14 to transmit the motor-drive start instruction to the main body control unit 4A. The main body control unit 4A then receives the motor-drive start instruction from the user (step S1). The motor-drive start instruction input into the remote controller 14 by the user includes an instruction with respect to the rotational speed of the motor 13.

This causes the main body control unit 4A to turn on the drive power supply unit 5 (step S2). The drive power supply unit 5 supplies power supply to the motor drive control unit 7A and to the inverter output unit 6 (step S3). The motor drive control unit 7A turns on the current change-over switch 11a (step S4), and starts obtaining the value of the voltage of the bus 9. The motor 13 then starts to operate (step S5).

After the motor 13 starts to operate, the rotational speed of the motor 13 reaches a rotational speed specified by the user (target rotational speed) (step S6). The current detection unit 12 detects the current flowing to the motor 13, and inputs the current value, which is the detection result, into the motor drive control unit 7A (step S7). The current detection unit 12 inputs the current value detected, into the motor drive control unit 7A every time period t1, which is a specific time interval. The motor drive control unit 7A stores the current value received.

Then, the motor drive control unit 7A determines whether or not the current value obtained from the current detection unit 12 after a lapse of a time period t2, which is an arbitrary time period, has changed from the current value obtained the last time (the current value obtained the time period t2 before) by an amount greater than or equal to an arbitrary threshold X1 (step S8). That is, the motor drive control unit 7A determines whether or not the latest current value and the immediately previous current value obtained the time period t2 before differ from each other by an amount greater than or equal to the threshold X1.

If the current value has changed by an amount greater than or equal to the threshold X1 (Yes at step S8), the motor drive control unit 7A maintains the current change-over switch 11a in an ON state (step S9), and the process returns to step S7. Alternatively, if the current value has only changed by an amount less than the threshold X1 (No at step S8), no monitoring is required for the voltage due to stability of the voltage of the bus 9. The motor drive control unit 7A therefore turns off the current change-over switch 11a (step S10).

The current detection unit 12 detects the current value of the current flowing to the motor 13 periodically (every time period t1) even after the current change-over switch 11a has been turned off, and inputs the current value, which is the detection result, into the motor drive control unit 7A (step S11).

Then, the motor drive control unit 7A determines whether or not the current value obtained from the current detection unit 12 after a lapse of the time period t2, which is an arbitrary time period, has changed from the current value obtained the last time (the current value obtained the time period t2 before) by an amount greater than or equal to the arbitrary threshold X1 (step S12).

Note that the threshold X1 used at step S12 and the threshold X1 used at step S8 may represent different values. In addition, the time period t2 used at step S12 and the time period t2 used at step S8 may represent different time periods. The threshold X1 at step S8 is a first threshold, and the threshold X1 at step S12 is a second threshold. In addition, the time period t2 at step S8 is a first time period, and the time period t2 at step S12 is a second time period.

If the current value has only changed by an amount less than the threshold X1 (No at step S12), no monitoring is required for the voltage due to continued stability of the voltage of the bus 9. The motor drive control unit 7A therefore maintains the current change-over switch 11a in an OFF state (step S13), and the process returns to step S11.

If the current value has changed by an amount greater than or equal to the threshold X1 (Yes at step S12), the motor drive control unit 7A determines that the voltage value needs to be detected due to instability of the voltage of the bus 9, and thus turns on the current change-over switch 11a (step S14).

As described above, the motor drive device 101A turns off the current change-over switch 11a to allow a current to flow to the voltage detection unit 8 through the current limiting resistor 11b when no voltage value detection is required even when the motor 13 is being driven. This can reduce power consumption. In addition, the motor drive device 101A can detect the voltage value by turning on the current change-over switch 11a when the voltage value detection is required.

The motor drive device 101A operates as described above with reference to FIG. 4 during motor driving, but depending on the case, may receive, from the user, an instruction to change the rotational speed of the motor 13 (rotational-speed change instruction), and thus change the target rotational speed.

For example, when an instruction to change the rotational speed of the motor 13 is received from the user during an ON state of the current change-over switch 11a, the motor drive device 101A maintains the current change-over switch 11a in an ON state until the rotational speed reaches the target rotational speed that reflects the changing of the rotational speed.

Moreover, the motor drive device 101A may, depending on the case, receive an instruction to change the rotational speed of the motor 13 from the user during an OFF state of the current change-over switch 11a. An operation of the motor drive device 101A in this case, that is, an operation of the motor drive device 101A in a case of reception of an instruction to change the rotational speed of the motor 13 while being stable, will be described below.

Figure 5:
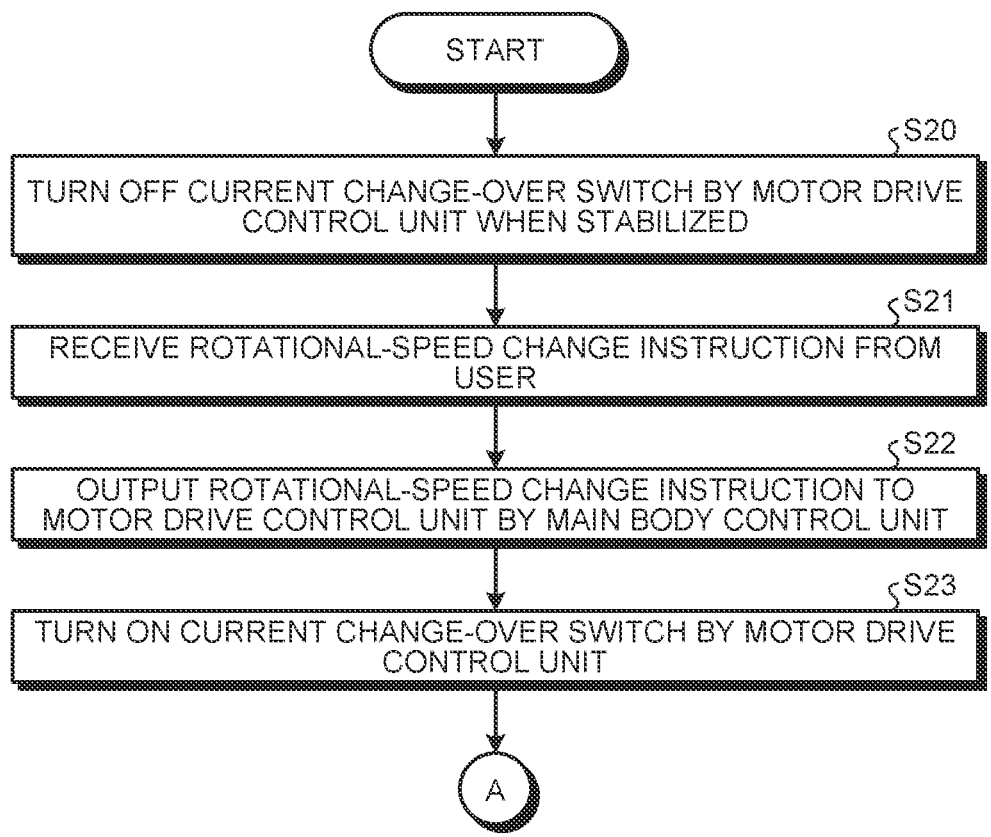
FIG. 5 is a flowchart illustrating an operation processing procedure of the motor drive device in a case in which an instruction to change the rotational speed of the motor is received while being stable by the motor drive device in the first configuration example according to the first embodiment.

FIG. 5 is a flowchart illustrating an operation processing procedure of the motor drive device in a case in which an instruction to change the rotational speed of the motor is received while being stable by the motor drive device in the first configuration example according to the first embodiment. When the rotational speed of the motor 13 reaches the target rotational speed, and becomes stable, the motor drive control unit 7A turns off the current change-over switch 11a (step S20). This processing at step S20 corresponds to the processing at step S10 described with reference to FIG. 4.

Upon inputting, by the user, of a rotational-speed change instruction to the remote controller 14 during an OFF state of the current change-over switch 11a, the remote controller 14 transmits the rotational-speed change instruction to the main body control unit 4A. The main body control unit 4A then receives the rotational-speed change instruction from the user (step S21).

This causes the main body control unit 4A to output the rotational-speed change instruction to the motor drive control unit 7A (step S22). Upon reception of the rotational-speed change instruction, the motor drive control unit 7A turns on the current change-over switch 11a (step S23).

The motor drive device 101A then returns the process to step S6 of FIG. 4, and performs the processing at step S6 and the later steps. Thus, the motor drive device 101A allows the rotational speed of the motor 13 to be changed while maintaining the stability by turning on the current change-over switch 11a even when a rotational-speed change instruction is received from the user during an OFF state of the current change-over switch 11a.

Note that FIGS. 1 to 5 illustrate a case in which the motor drive control unit 7A controls the current change-over switch 11a. However, the main body control unit (i.e., the main body control unit 4B described later) may control the current change-over switch 11a. That is, the current change-over switch 11a may be connected to the main body control unit 4B.

Figure 6:
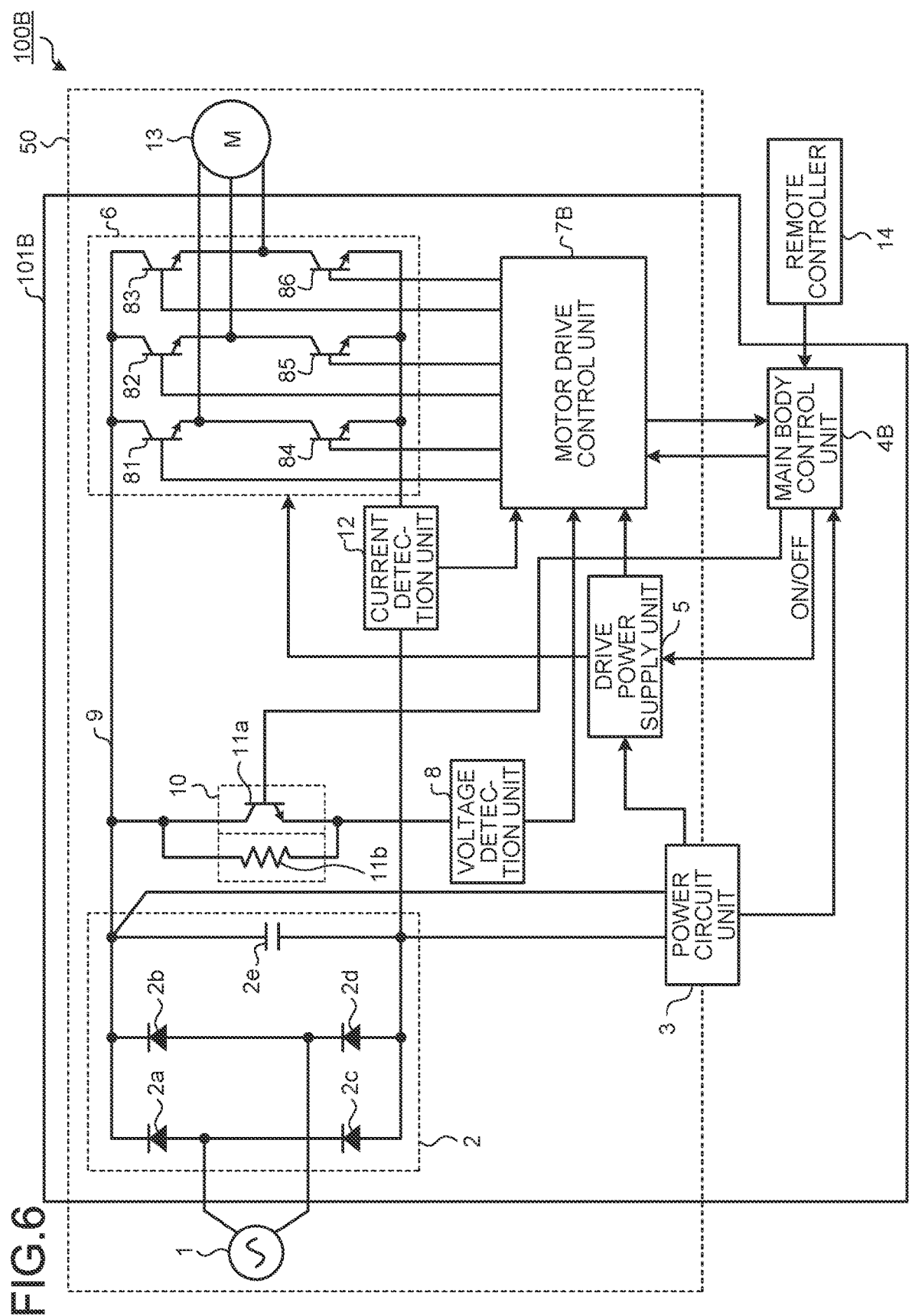
FIG. 6 is a diagram illustrating a second configuration example of the motor drive system including the motor drive device according to the first embodiment.

FIG. 6 is a diagram illustrating a second configuration example of the motor drive system including the motor drive device according to the first embodiment. Among the components in FIG. 6, components that provide the same functionality as the components of the motor drive system 100A illustrated in FIG. 1 are designated by like reference characters, and duplicate description thereof will be omitted.

A motor drive system 100B, having another configuration example of the motor drive system 100A, includes a motor drive device 101B, the motor 13, and the remote controller 14. The motor drive device 101B differs from the motor drive device 101A in including a main body control unit 4B in place of the main body control unit 4A, and including a motor drive control unit 7B in place of the motor drive control unit 7A.

The main body control unit 4B is connected to the current change-over switch 11a. The main body control unit 4B has, in addition to the functionality of the main body control unit 4A, functionality to control turning on and off of the current change-over switch 11a. The motor drive system 100B is not required to have the motor drive control unit 7B to be connected to the current change-over switch 11a. The motor drive control unit 7B does not control the current change-over switch 11a, but the functionality other than that is the same as the functionality of the motor drive control unit 7A.

Figure 7:
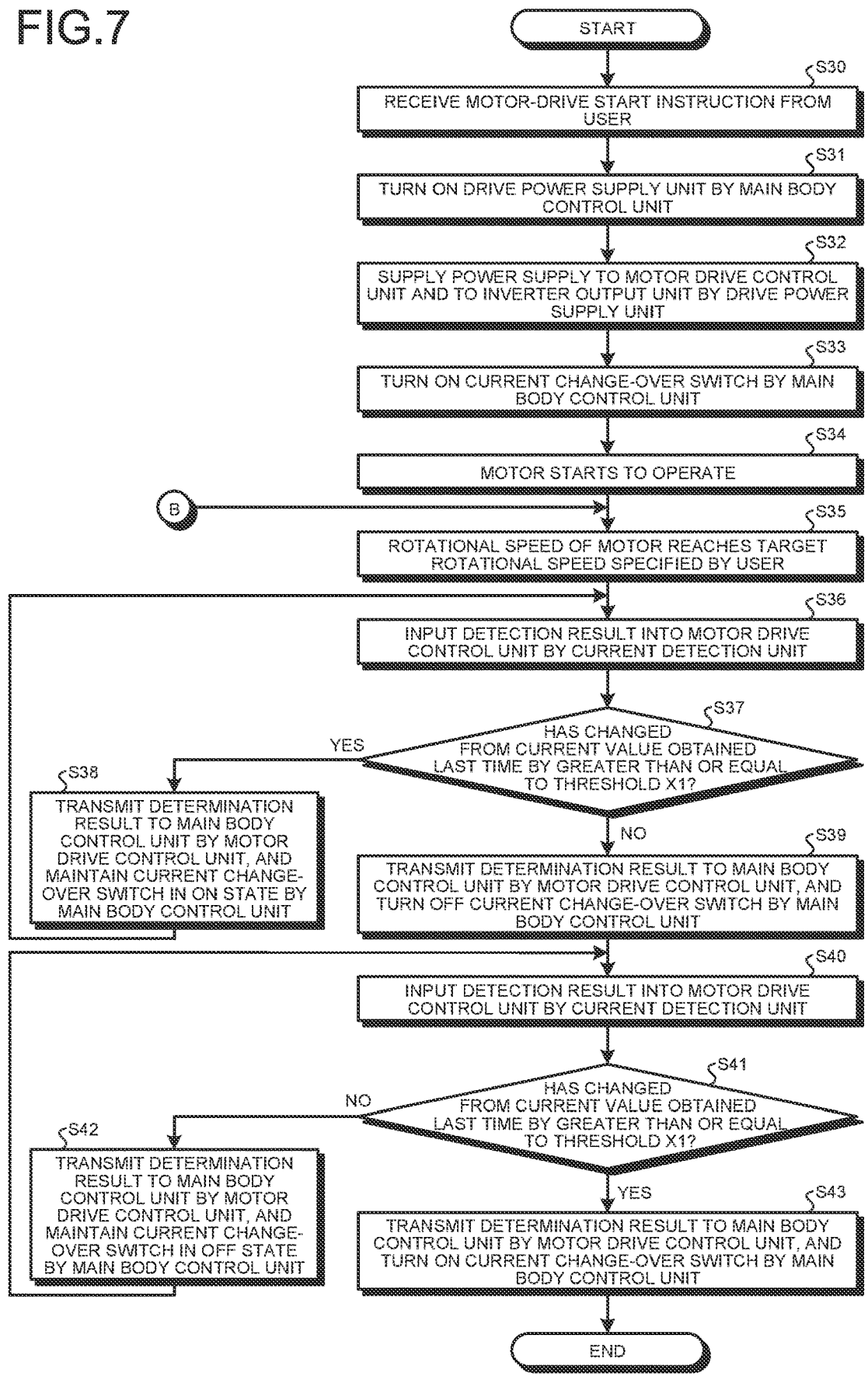
FIG. 7 is a flowchart illustrating an operation processing procedure of the motor drive device in the second configuration example according to the first embodiment.

FIG. 7 is a flowchart illustrating an operation processing procedure of the motor drive device in the second configuration example according to the first embodiment. Referring to FIG. 7, an operation processing procedure of the motor drive device 101B will be described in the context of controlling the current change-over switch 11a by the main body control unit 4B. Note that description of operation processing similar to the corresponding operation processing of the motor drive device 101A may be omitted.

When the motor 13 is not being driven, the motor drive control unit 7B is not supplied with operational power (supply power) from the drive power supply unit 5, and is thus not in operation. Due to the non-operational state of the motor drive control unit 7B, the current change-over switch 11a has also been turned off, thereby causing a current to flow to the voltage detection unit 8 through the current limiting resistor 11b.

An input from the user of a motor-drive start instruction into the remote controller 14 causes the remote controller 14 to transmit the motor-drive start instruction to the main body control unit 4B. The main body control unit 4B then receives the motor-drive start instruction from the user (step S30). The start instruction input into the remote controller 14 by the user includes an instruction with respect to the rotational speed of the motor 13.

This causes the main body control unit 4B to turn on the drive power supply unit 5 (step S31). The drive power supply unit 5 supplies power supply to the motor drive control unit 7B and to the inverter output unit 6 (step S32). The main body control unit 4B turns on the current change-over switch 11a (step S33), and starts obtaining the value of the voltage of the bus 9. The motor 13 then starts to operate (step S34).

After the motor 13 starts to operate, the rotational speed of the motor 13 reaches a rotational speed specified by the user (target rotational speed) (step S35). The current detection unit 12 detects the current flowing to the motor 13, and inputs the current value, which is the detection result, into the motor drive control unit 7B (step S36). The current detection unit 12 inputs the current value detected, into the motor drive control unit 7B every time period t1, which is a specific time interval. The motor drive control unit 7B stores the current value that has been input.

Then, the motor drive control unit 7B determines whether or not the current value obtained from the current detection unit 12 after a lapse of the time period t2, which is an arbitrary time period, has changed from the current value obtained the last time (the current value obtained the time period t2 before) by an amount greater than or equal to an arbitrary threshold X1 (step S37). That is, the motor drive control unit 7B determines whether or not the latest current value and the immediately previous current value obtained the time period t2 before, differ from each other by an amount greater than or equal to the threshold X1.

If the current value has changed by an amount greater than or equal to the threshold X1 (Yes at step S37), the motor drive control unit 7B transmits a determination result indicating that the current value has changed by an amount greater than or equal to the threshold X1 to the main body control unit 4B. The main body control unit 4B maintains the current change-over switch 11a in an ON state (step S38), and the process then returns to step S36. Alternatively, if the current value has only changed by an amount less than the threshold X1 (No at step S37), the motor drive control unit 7B transmits a determination result indicating that the current value has only changed by an amount less than the threshold X1 to the main body control unit 4B, and the main body control unit 4B turns off the current change-over switch 11a (step S39).

The current detection unit 12 detects the current value of the current flowing to the motor 13 periodically (every time period t1) even after the current change-over switch 11a has been turned off, and inputs the current value, which is the detection result, into the motor drive control unit 7B (step S40).

Then, the motor drive control unit 7B determines whether the current value obtained from the current detection unit 12 after a lapse of the time period t2, which is an arbitrary time period, has changed from the current value obtained the last time (the current value obtained the time period t2 before) by an amount greater than or equal to the arbitrary threshold X1 (step S41).

Note that the threshold X1 used at step S41 and the threshold X1 used at step S37 may represent different values. In addition, the time period t2 used at step S41 and the time period t2 used at step S37 may represent different time periods. The threshold X1 at step S37 is a first threshold, and the threshold X1 at step S41 is a second threshold. In addition, the time period t2 at step S37 is a first time period, and the time period t2 at step S41 is a second time period.

If the current value has only changed by an amount less than the threshold X1 (No at step S41), the motor drive control unit 7B transmits a determination result indicating that the current value has only changed by an amount less than the threshold X1 to the main body control unit 4B. The main body control unit 4B maintains the current change-over switch 11a in an OFF state (step S42), and the process then returns to step S40.

If the current value has changed by an amount greater than or equal to the threshold X1 (Yes at step S41), the motor drive control unit 7B transmits a determination result indicating that the current value has changed by an amount greater than or equal to the threshold X1 to the main body control unit 4B, and the main body control unit 4B turns on the current change-over switch 11a (step S43).

The motor drive device 101B operates as described above with reference to FIG. 7 during motor driving, but depending on the case, may receive, from the user, an instruction to change the rotational speed of the motor 13 (rotational-speed change instruction), and thus change the target rotational speed.

For example, when an instruction to change the rotational speed of the motor 13 is received from the user during an ON state of the current change-over switch 11a, the motor drive device 101B maintains the current change-over switch 11a in an ON state until the rotational speed reaches the target rotational speed that reflects the changing of the rotational speed.

Moreover, the motor drive device 101B may, depending on the case, receive an instruction to change the rotational speed of the motor 13 from the user during an OFF state of the current change-over switch 11a. An operation of the motor drive device 101B in this case, that is, an operation of the motor drive device 101B in a case of reception of an instruction to change the rotational speed of the motor 13 while being stable, will be described below.

Figure 8:
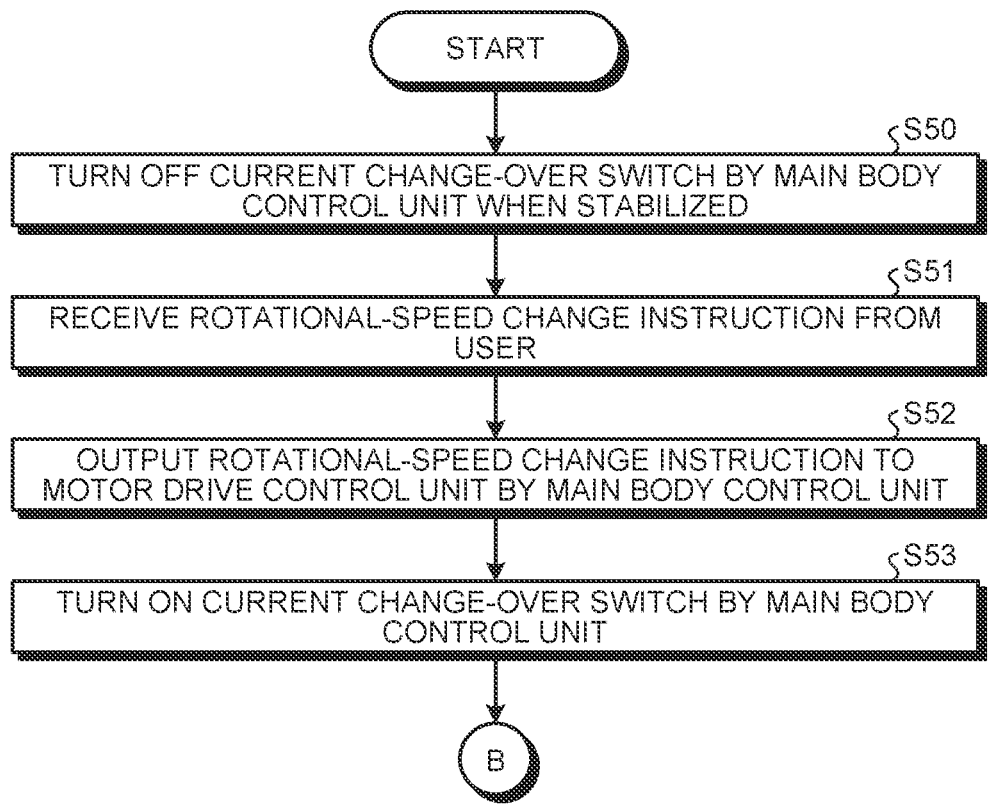
FIG. 8 is a flowchart illustrating an operation processing procedure of the motor drive device in a case in which an instruction to change the rotational speed of the motor is received while being stable by the motor drive device in the second configuration example according to the first embodiment.

FIG. 8 is a flowchart illustrating an operation processing procedure of the motor drive device in a case in which an instruction to change the rotational speed of the motor is received while being stable by the motor drive device in the second configuration example according to the first embodiment. When the rotational speed of the motor 13 reaches the target rotational speed, and becomes stable, the main body control unit 4B turns off the current change-over switch 11a according to the instruction from the motor drive control unit 7B (step S50). This processing at step S50 corresponds to the processing at step S39 described with reference to FIG. 7.

Upon inputting, by the user, of a rotational-speed change instruction to the remote controller 14 during an OFF state of the current change-over switch 11a, the remote controller 14 transmits the rotational-speed change instruction to the main body control unit 4B. The main body control unit 4B then receives the rotational-speed change instruction from the user (step S51).

This causes the main body control unit 4B to output the rotational-speed change instruction to the motor drive control unit 7B (step S52). Upon reception of the rotational-speed change instruction, the motor drive control unit 7B turns on the current change-over switch 11a (step S53).

The motor drive device 101B then returns the process to step S35 of FIG. 7, and performs the processing at step S35 and the later steps. Thus, the motor drive device 101B allows the rotational speed of the motor 13 to be changed while maintaining the stability by turning on the current change-over switch 11a even when a rotational-speed change instruction is received from the user during an OFF state of the current change-over switch 11a.

Although FIG. 8 illustrates a case in which the main body control unit 4B turns on the current change-over switch 11a after issuance of a rotational-speed change instruction to the motor drive control unit 7B, the main body control unit 4B may turn on the current change-over switch 11a simultaneously with issuance of a rotational-speed change instruction to the motor drive control unit 7B.

Figure 9:
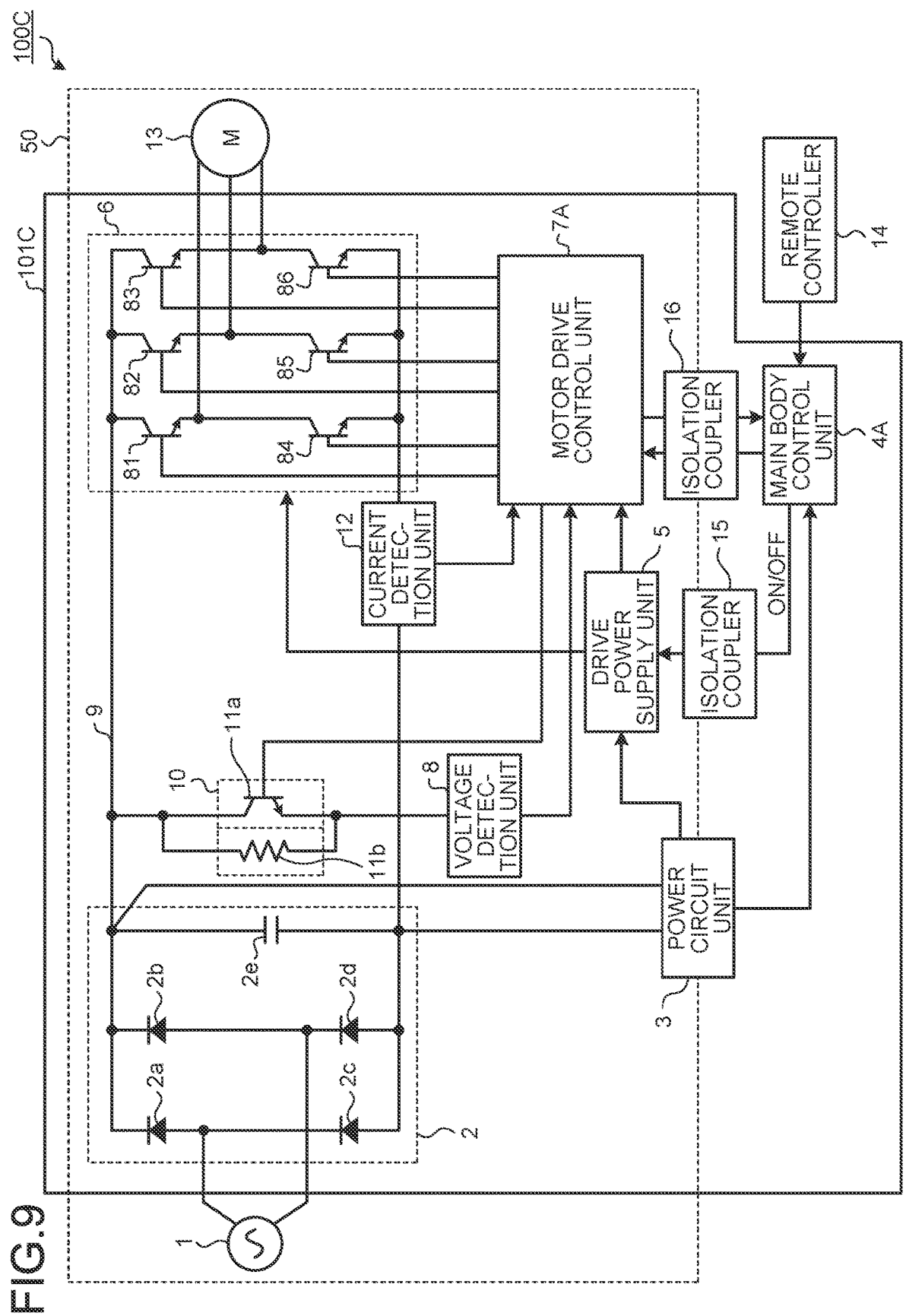
FIG. 9 is a diagram illustrating a third configuration example of the motor drive system including the motor drive device according to the first embodiment.

The main body control unit 4A illustrated in FIG. 1 may be insulated from a portion enclosed by the broken line 50. FIG. 9 is a diagram illustrating a third configuration example of the motor drive system including the motor drive device according to the first embodiment. Among the components in FIG. 9, components that provide the same functionality as the components of the motor drive system 100A illustrated in FIG. 1 are designated by like reference characters, and duplicate description thereof will be omitted.

A motor drive system 100C, having an insulated configuration, differs from the motor drive system 100A in including a motor drive device 101C in place of the motor drive device 101A. The insulated configuration refers to a configuration that electrically isolates the main body control unit 4A from the components inside the broken line 50, in other words, a configuration of decoupling in terms of circuit configuration.

The motor drive device 101C includes isolation couplers 15 and 16 in addition to the components of the motor drive device 101A. The isolation couplers 15 and 16 insulate the main body control unit 4A from the portion enclosed by the broken line 50. The isolation coupler 15 is disposed between the main body control unit 4A and the drive power supply unit 5, and the isolation coupler 16 is disposed between the main body control unit 4A and the motor drive control unit 7A. Thus, insertion of the isolation couplers 15 and 16 between the main body control unit 4A and the components inside the broken line 50, enables the main body control unit 4A to be electrically isolated from the components inside the broken line 50.

Note that the isolation couplers 15 and 16 may also be provided for the motor drive device 101B of FIG. 6. In this case, the isolation coupler 15 will be disposed between the main body control unit 4B and the drive power supply unit 5, and the isolation coupler 16 will be disposed between the main body control unit 4B and the motor drive control unit 7B. Moreover, an isolation coupler will be disposed between the main body control unit 4B and the current change-over switch 11a.

Note that FIGS. 1, 6, and 9 illustrate the power circuit unit 3 on the boundary of the broken line 50, meaning that the power circuit unit 3 itself is an electrically isolated power supply having the primary part and the secondary part thereof being insulated from each other by, for example, use of an isolation transformer. An example of the power circuit unit 3 is a flyback converter.

Note that FIG. 9 differs from FIG. 1 in the presence or absence of the isolation couplers 15 and 16, and the operation processing procedure of the motor drive device 101C is similar to the operation processing procedure of the motor drive device 101A illustrated in FIG. 1. Description thereof will therefore be omitted.

As described above, according to the first embodiment, turning off of the current change-over switch 11a when no detection is required with respect to the value of the voltage of the bus 9, enables a current to flow to the voltage detection unit 8 through the current limiting resistor 11b when no detection is required with respect to the value of the voltage of the bus 9. This can reduce power consumption.

In addition, connection of the current limiting resistor 11b in parallel with the current change-over switch 11a allows the voltage applied to the current change-over switch 11a to be reduced using a simple structure, and enables an inexpensive switch to be used as the current change-over switch 11a.

Second Embodiment

A second embodiment of this invention will next be described with reference to FIGS. 10 to 14. In the second embodiment, control is provided to turn on or turn off the current change-over switch 11a based on a change in the rotational speed of the motor 13.

Figure 10:
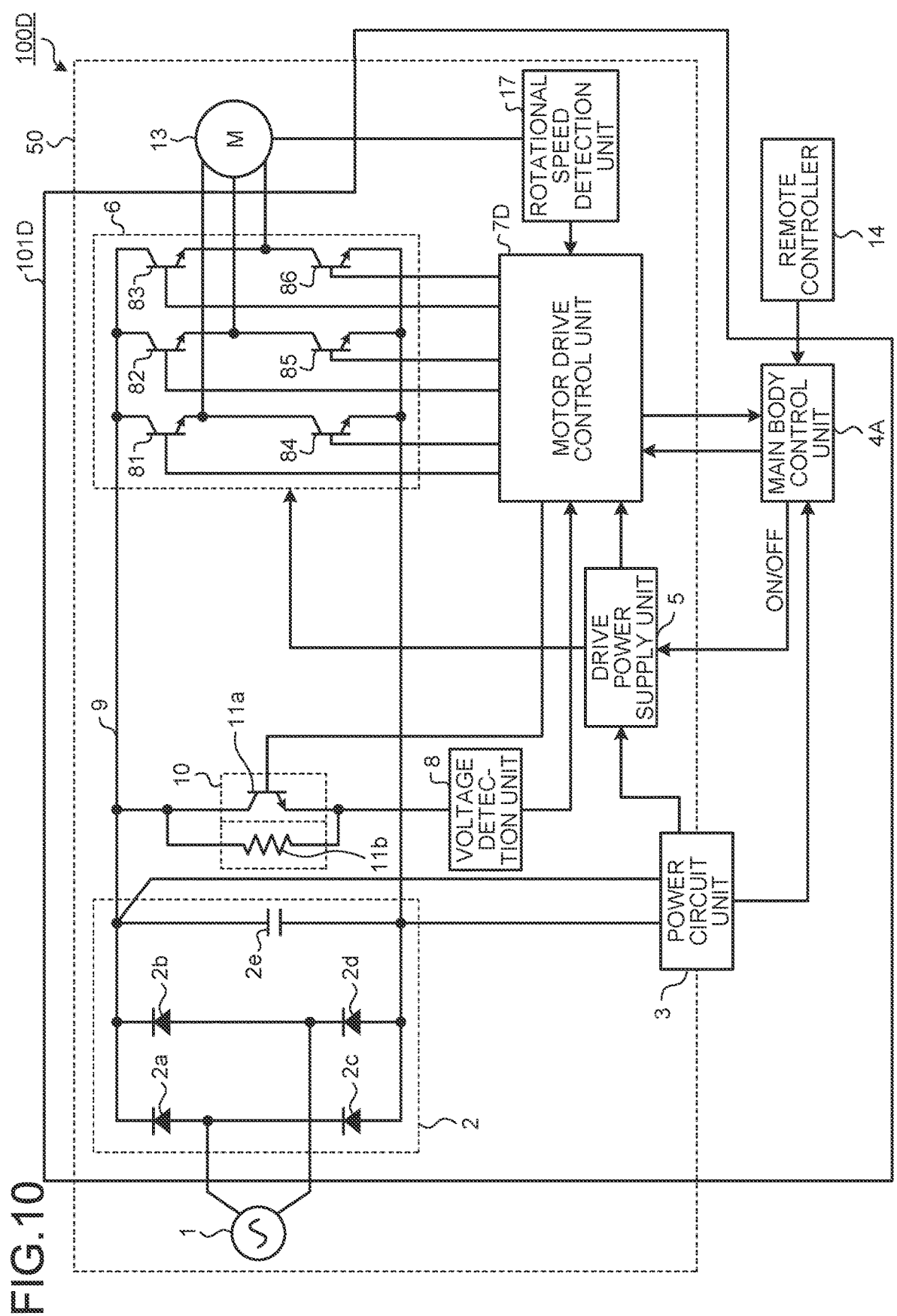
FIG. 10 is a diagram illustrating a first configuration example of a motor drive system including a motor drive device according to a second embodiment.

FIG. 10 is a diagram illustrating a first configuration example of a motor drive system including a motor drive device according to the second embodiment. Among the components in FIG. 10, components that provide the same functionality as the components of the motor drive device 101A of the first embodiment illustrated in FIG. 1 are designated by like reference characters, and duplicate description thereof will be omitted. A motor drive system 100D according to the second embodiment includes a motor drive device 101D, the motor 13, and the remote controller 14.

The motor drive device 101D differs from the motor drive device 101A in including a rotational speed detection unit 17 in place of the current detection unit 12, and including a motor drive control unit 7D in place of the motor drive control unit 7A.

The rotational speed detection unit 17 is connected to the motor 13 and to the motor drive control unit 7D. The rotational speed detection unit 17 detects the rotational speed of the motor 13, and inputs the rotational speed, which is the detection result, into the motor drive control unit 7D. This causes the motor drive control unit 7D to know the rotational speed of the motor 13.

The motor drive control unit 7D, which is an inverter control device, outputs a signal for driving the motor 13 to the inverter output unit 6 to control the inverter output unit 6. The motor drive control unit 7D controls the inverter output unit 6 based on the voltage value detected by the voltage detection unit 8, and controls the current change-over switch 11a based on the rotational speed detected by the rotational speed detection unit 17.

Operational timing of the motor drive device 101D when the motor drive device 101D drives the motor 13 will next be described. Among the operational timing points of the motor drive device 101D, operational timing points similar to the operational timing points of the motor drive device 101A may not be duplicately described.

Connection of the commercial power supply 1 to the supply power generation unit 2 causes the supply power generation unit 2 to generate a DC voltage, supply the DC voltage generated to the power circuit unit 3, and supply the DC voltage to the inverter output unit 6 via the bus 9. Upon reception of the DC voltage, the power circuit unit 3 supplies the voltage to each of the main body control unit 4A and the drive power supply unit 5.

Upon reception of a motor drive command from the remote controller 14, the main body control unit 4A turns on the drive power supply unit 5, and accordingly, also turns on the motor drive control unit 7D. After a specific time period has elapsed, the motor drive control unit 7D turns on the current change-over switch 11a. This causes the current limiting resistor 11b, disposed between the supply power generation unit 2 and the voltage detection unit 8, to be short-circuited by the current change-over switch 11a, which enables the voltage detection unit 8 to detect the value of the voltage of the bus 9. After the motor 13 starts to operate, the rotational speed detection unit 17 detects the rotational speed of the motor 13, and inputs the rotational speed, which is the detection result, into the motor drive control unit 7D.

When motor driving is to be stopped, the main body control unit 4A receives a motor-drive stop command from the remote controller 14, and after a specific time period has elapsed, turns off the drive power supply unit 5. At the same time, the motor drive control unit 7D and the current change-over switch 11a are turned off, thereby causing the current limiting resistor 11b to be connected between the supply power generation unit 2 and the voltage detection unit 8.

Figure 11:
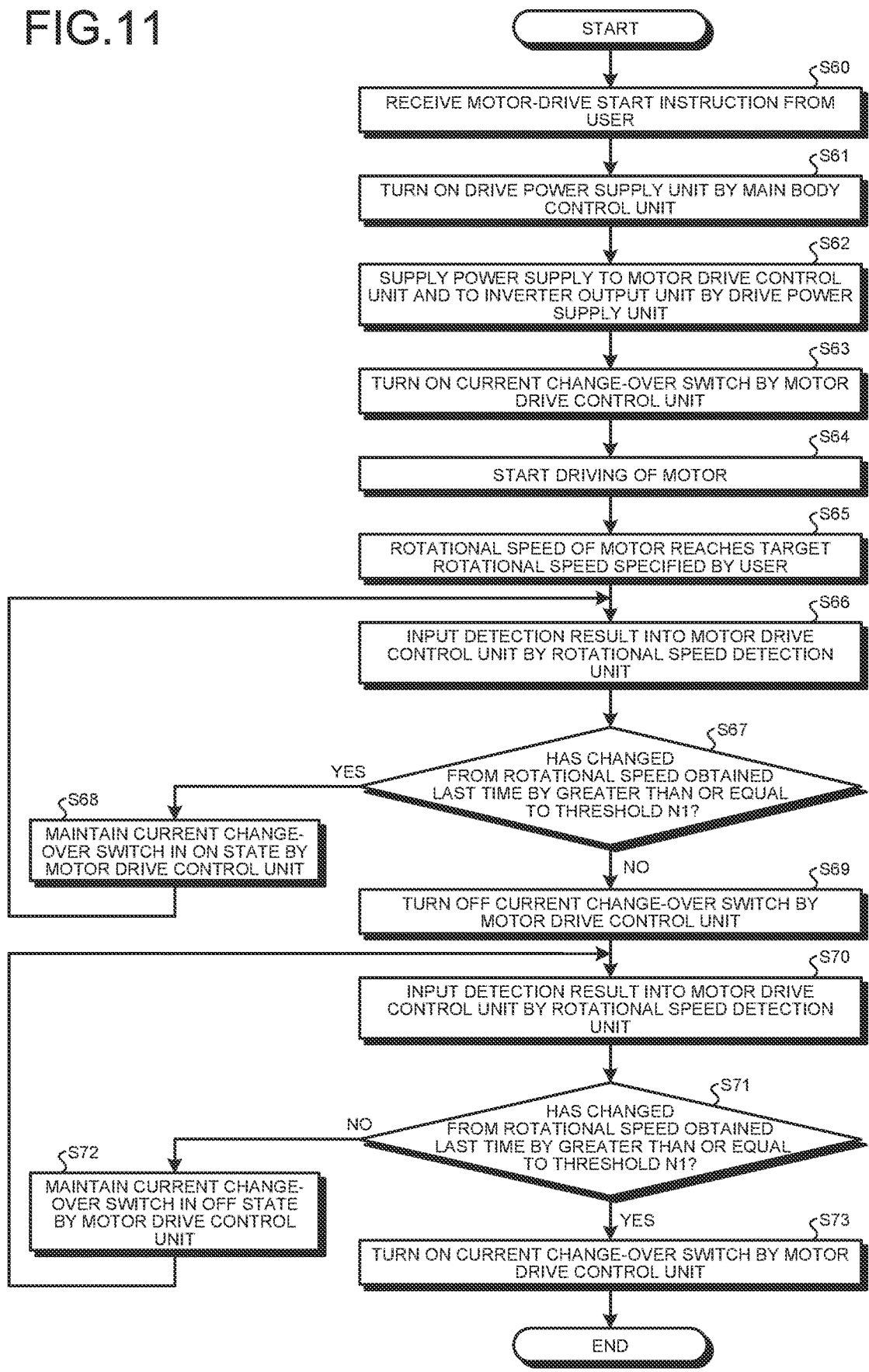
FIG. 11 is a flowchart illustrating an operation processing procedure of the motor drive device in the first configuration example according to the second embodiment.

FIG. 11 is a flowchart illustrating an operation processing procedure of the motor drive device in the first configuration example according to the second embodiment. When the motor 13 is not being driven, the motor drive control unit 7D is not supplied with operational power (supply power) from the drive power supply unit 5, and is thus not in operation. Due to the non-operational state of the motor drive control unit 7D, the current change-over switch 11a has also been turned off, thereby causing a current to flow to the voltage detection unit 8 through the current limiting resistor 11b.

An input from the user of a motor-drive start instruction into the remote controller 14 causes the remote controller 14, to transmit the motor-drive start instruction to the main body control unit 4A. The main body control unit 4A then receives the motor-drive start instruction from the user (step S60). The start instruction input into the remote controller 14 by the user includes an instruction corresponding to the rotational speed of the motor 13.

This causes the main body control unit 4A to turn on the drive power supply unit 5 (step S61). The drive power supply unit 5 supplies power supply to the motor drive control unit 7D and to the inverter output unit 6 (step S62). The motor drive control unit 7D turns on the current change-over switch 11a (step S63), and starts obtaining the value of the voltage of the bus 9. The motor 13 then starts to operate (step S64).

After the motor 13 starts to operate, the rotational speed of the motor 13 reaches a rotational speed specified by the user (target rotational speed) (step S65). The rotational speed detection unit 17 detects the rotational speed of the motor 13, and inputs the rotational speed, which is the detection result, into the motor drive control unit 7D (step S66). The rotational speed detection unit 17 inputs the rotational speed detected, into the motor drive control unit 7D every time period t3, which is a specific time interval. The motor drive control unit 7D stores the rotational speed that has been input.

Then, the motor drive control unit 7D determines whether or not the rotational speed obtained from the rotational speed detection unit 17 after a lapse of a time period t4, which is an arbitrary time period, has changed from the rotational speed obtained the last time (the rotational speed obtained the time period t4 before) by an amount greater than or equal to an arbitrary threshold N1 (rpm) (step S67). That is, the motor drive control unit 7D determines whether or not the latest rotational speed and the immediately previous rotational speed obtained the time period t4 before, differ from each other by an amount greater than or equal to the threshold N1.

If the rotational speed has changed by an amount greater than or equal to the threshold N1 (Yes at step S67), the motor drive control unit 7D maintains the current change-over switch 11a in an ON state (step S68), and the process returns to step S66. Alternatively, if the rotational speed has only changed by an amount less than the threshold N1 (No at step S67), no monitoring is required for the voltage due to stability of the voltage of the bus 9. The motor drive control unit 7D therefore turns off the current change-over switch 11a (step S69).

The rotational speed detection unit 17 detects the rotational speed of the motor 13 periodically (every time period t3) even after the current change-over switch 11a has been turned off, and inputs the rotational speed, which is the detection result, into the motor drive control unit 7D (step S70).

Then, the motor drive control unit 7D determines whether or not the rotational speed obtained from the rotational speed detection unit 17 after a lapse of the time period t4, which is an arbitrary time period, has changed from the rotational speed obtained the last time (the rotational speed obtained the time period t4 before) by an amount greater than or equal to the threshold N1 (step S71).

Note that the threshold N1 used at step S71 and the threshold N1 used at step S67 may represent different values. In addition, the time period t4 used at step S71 and the time period t4 used at step S67 may represent different time periods. The threshold N1 at step S67 is a first threshold, and the threshold N1 at step S71 is a second threshold. In addition, the time period t4 at step S67 is a first time period, and the time period t4 at step S71 is a second time period.

If the rotational speed has only changed by an amount less than the threshold N1 (No at step S71), no monitoring is required for the voltage due to continued stability of the voltage of the bus 9. The motor drive control unit 7D therefore maintains the current change-over switch 11a in an OFF state (step S72), and the process returns to step S70.

If the rotational speed has changed by an amount greater than or equal to the threshold N1 (Yes at step S71), the motor drive control unit 7D determines that the voltage value needs to be detected due to instability of the voltage of the bus 9, and thus turns on the current change-over switch 11a (step S73).

As described above, the motor drive device 101D turns off the current change-over switch 11a to allow a current to flow to the voltage detection unit 8 through the current limiting resistor 11b when no voltage value detection is required even when the motor 13 is being driven. This can reduce power consumption. In addition, the motor drive device 101D can detect the voltage value by turning on the current change-over switch 11a when the voltage value detection is required.

The motor drive device 101D operates as described above with reference to FIG. 11 during motor driving. However, depending on the case, the motor drive device 101D may receive, from the user, an instruction to change the rotational speed of the motor 13 (rotational-speed change instruction), and thus change the target rotational speed.

For example, when an instruction to change the rotational speed of the motor 13 is received from the user during an ON state of the current change-over switch 11a, the motor drive device 101D maintains the current change-over switch 11a in an ON state until the rotational speed reaches the target rotational speed that reflects the changing of the rotational speed.

Moreover, the motor drive device 101D may, depending on the case, receive an instruction to change the rotational speed of the motor 13 from the user during an OFF state of the current change-over switch 11a. The operation of the motor drive device 101D in this case, that is, the operation of the motor drive device 101D in a case of reception of an instruction to change the rotational speed of the motor 13 while being stable, is similar to the operation described with reference to FIG. 5 in the first embodiment.

Note that although FIGS. 10 and 11 illustrate a case in which the motor drive control unit 7D controls the current change-over switch 11a, the main body control unit 4A may control the current change-over switch 11a. That is, the current change-over switch 11a may be connected to the main body control unit 4A.

Figure 12:
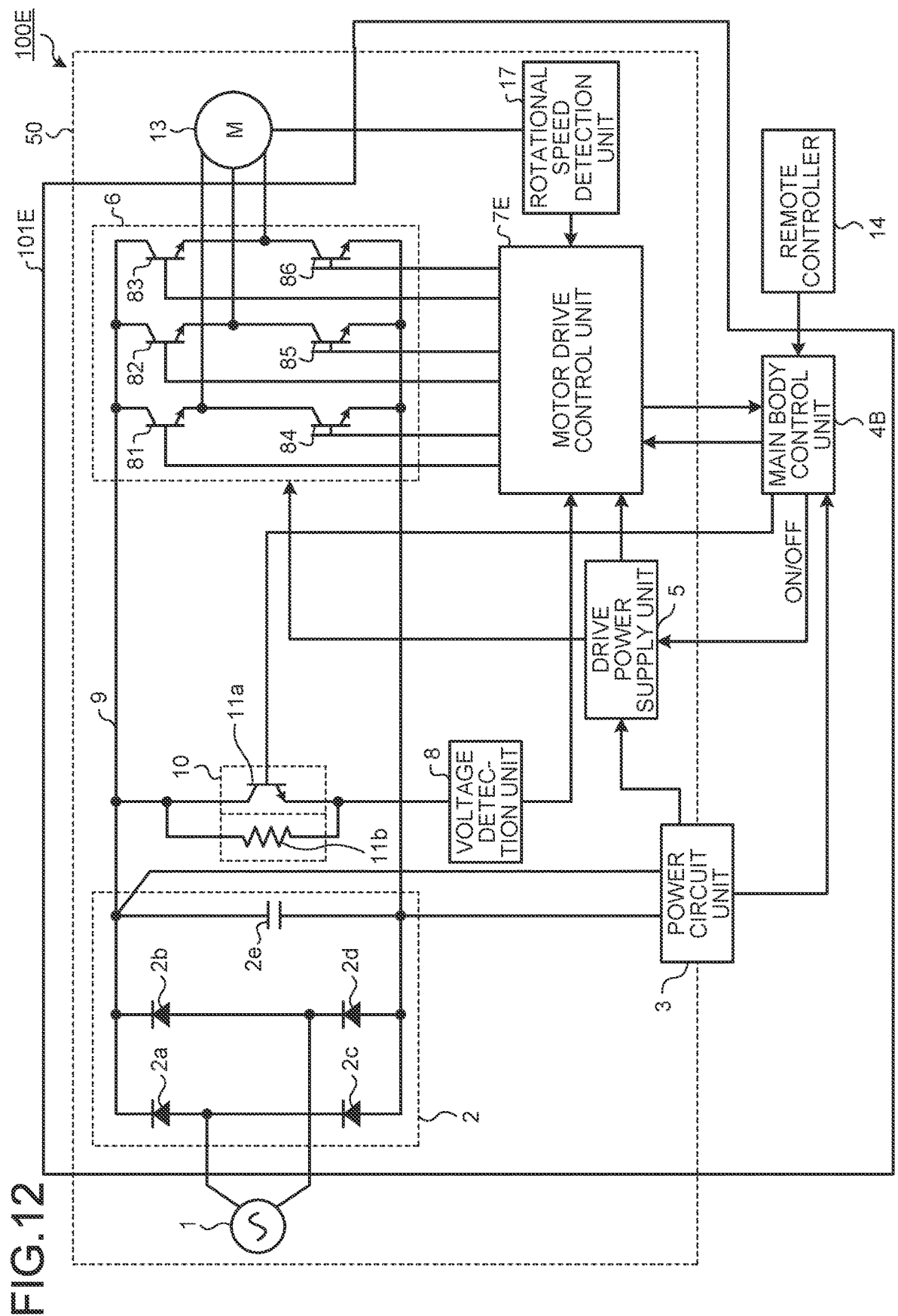
FIG. 12 is a diagram illustrating a second configuration example of the motor drive system including the motor drive device according to the second embodiment.

FIG. 12 is a diagram illustrating a second configuration example of the motor drive system including the motor drive device according to the second embodiment. Among the components in FIG. 12, components that provide the same functionality as the components of the motor drive system 100B illustrated in FIG. 6 or of the motor drive system 100D illustrated in FIG. 10 are designated by like reference characters, and duplicate description thereof will be omitted.

A motor drive system 100E, having another configuration example of the motor drive system 100D, includes a motor drive device 101E, the motor 13, and the remote controller 14. The motor drive device 101E differs from the motor drive device 101D in including the main body control unit 4B in place of the main body control unit 4A, and including a motor drive control unit 7E in place of the motor drive control unit 7D.

The main body control unit 4B of the motor drive device 101E has functionality similar to the functionality of, and operates similarly to, the main body control unit 4B included in the motor drive device 101B. The motor drive system 100E is not required to have the motor drive control unit 7E to be connected to the current change-over switch 11a. The motor drive control unit 7E does not control the current change-over switch 11a, but the functionality other than that is the same as the functionality of the motor drive control unit 7D.

Figure 13:
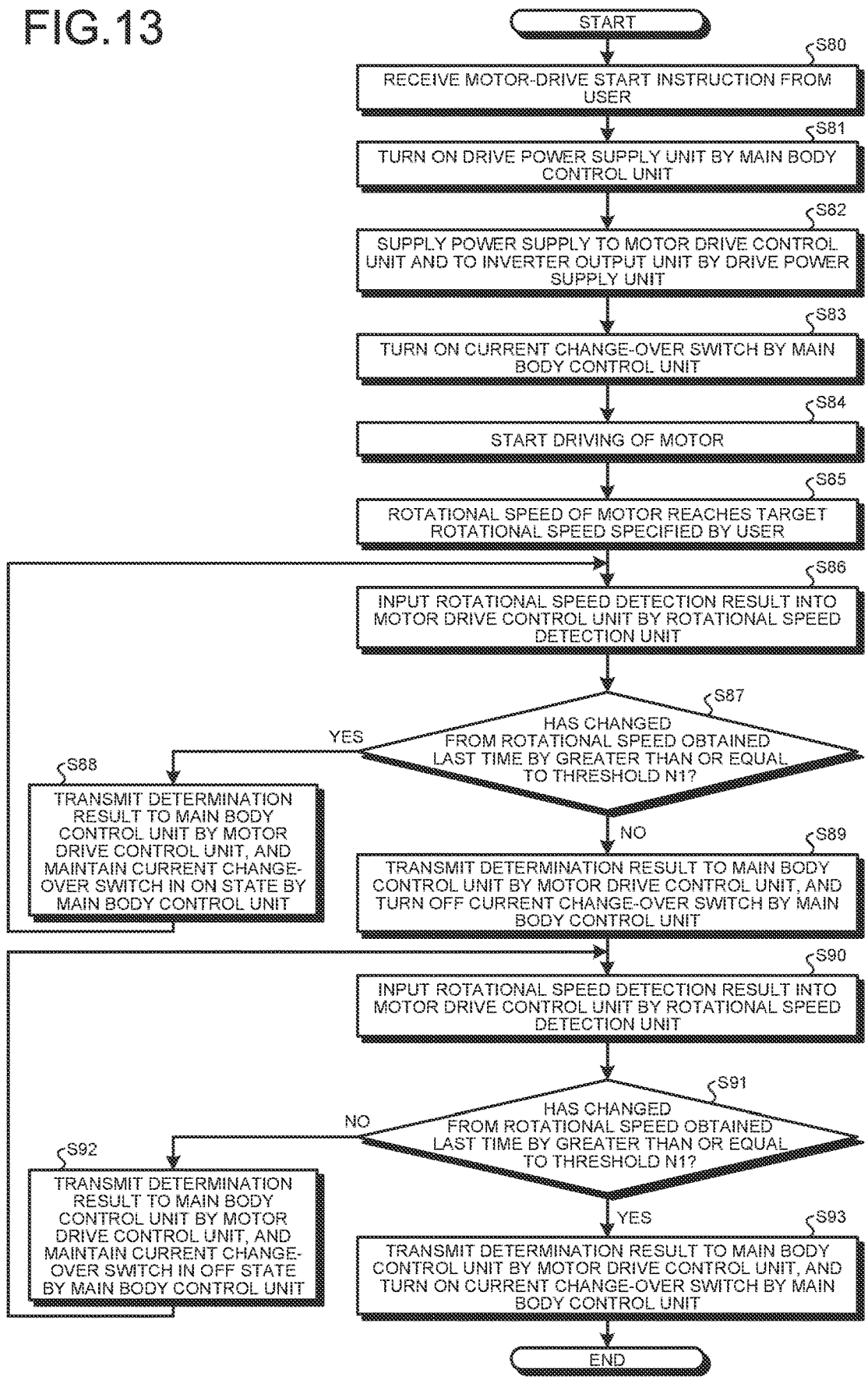
FIG. 13 is a flowchart illustrating an operation processing procedure of the motor drive device in the second configuration example according to the second embodiment.

FIG. 13 is a flowchart illustrating an operation processing procedure of the motor drive device in the second configuration example according to the second embodiment. Referring to FIG. 13, an operation processing procedure of the motor drive device 101E will be described in the context of controlling the current change-over switch 11a by the main body control unit 4B. Note that description of operation processing similar to the corresponding operation processing of the motor drive devices 101B or 101D may be omitted.

When the motor 13 is not being driven, the motor drive control unit 7E is not supplied with operational power (supply power) from the drive power supply unit 5, and is thus not in operation. Due to the non-operational state of the motor drive control unit 7E, the current change-over switch 11a has also been turned off, thereby causing a current to flow to the voltage detection unit 8 through the current limiting resistor 11b.

An input from the user of a motor-drive start instruction into the remote controller 14, causes the remote controller 14 to transmit the motor-drive start instruction to the main body control unit 4B. The main body control unit 4B then receives the motor-drive start instruction from the user (step S80). The start instruction input into the remote controller 14 by the user includes an instruction with respect to the rotational speed of the motor 13.

This causes the main body control unit 4B to turn on the drive power supply unit 5 (step S81). The drive power supply unit 5 supplies power supply to the motor drive control unit 7E and to the inverter output unit 6 (step S82). The main body control unit 4B turns on the current change-over switch 11a (step S83), and starts obtaining the value of the voltage of the bus 9. The motor 13 then starts to operate (step S84).

After the motor 13 starts to operate, the rotational speed of the motor 13 reaches a rotational speed specified by the user (target rotational speed) (step S85). The rotational speed detection unit 17 detects the rotational speed of the motor 13, and inputs the rotational speed, which is the detection result, into the motor drive control unit 7E (step S86). The rotational speed detection unit 17 inputs the rotational speed detected, into the motor drive control unit 7E every time period t3, which is a specific time interval. The motor drive control unit 7E stores the rotational speed that has been input.

Then, the motor drive control unit 7E determines whether or not the rotational speed obtained from the rotational speed detection unit 17 after a lapse of the time period t4, which is an arbitrary time period, has changed from the rotational speed obtained the last time (the rotational speed obtained the time period t4 before) by an amount greater than or equal to an arbitrary threshold N1 (step S87). That is, the motor drive control unit 7E determines whether or not the latest rotational speed and the immediately previous rotational speed obtained the time period t4 before, differ from each other by an amount greater than or equal to the threshold N1.

If the rotational speed has changed by an amount greater than or equal to the threshold N1 (Yes at step S87), the motor drive control unit 7E transmits a determination result indicating that the rotational speed has changed by an amount greater than or equal to the threshold N1 to the main body control unit 4B, the main body control unit 4B maintains the current change-over switch 11a in an ON state (step S88), and the process then returns to step S86. Alternatively, if the rotational speed has only changed by an amount less than the threshold N1 (No at step S87), the motor drive control unit 7E transmits a determination result indicating that the rotational speed value has only changed by an amount less than the threshold N1 to the main body control unit 4B, and the main body control unit 4B turns off the current change-over switch 11a (step S89).

The rotational speed detection unit 17 detects the rotational speed of the motor 13 periodically (every time period t3) even after the current change-over switch 11a has been turned off, and inputs the rotational speed, which is the detection result, into the motor drive control unit 7E (step S90).

Then, the motor drive control unit 7E determines whether or not the rotational speed obtained from the rotational speed detection unit 17 after a lapse of the time period t4, which is an arbitrary time period, has changed from the rotational speed obtained the last time (the rotational speed obtained the time period t4 before) by an amount greater than or equal to the arbitrary threshold N1 (step S91).

Note that the threshold N1 used at step S91 and the threshold N1 used at step S87 may represent different values. In addition, the time period t4 used at step S91 and the time period t4 used at step S87 may represent different time periods. The threshold N1 at step S87 is a first threshold, and the threshold N1 at step S91 is a second threshold. In addition, the time period t4 at step S87 is a first time period, and the time period t4 at step S91 is a second time period.

If the rotational speed has only changed by an amount less than the threshold N1 (No at step S91), the motor drive control unit 7E transmits a determination result indicating that the rotational speed has only changed by an amount less than the threshold N1 to the main body control unit 4B, the main body control unit 4B maintains the current change-over switch 11a in an OFF state (step S92), and the process then returns to step S90.

If the rotational speed has changed by an amount greater than or equal to the threshold N1 (Yes at step S91), the motor drive control unit 7E transmits a determination result indicating that the rotational speed has changed by an amount greater than or equal to the threshold N1 to the main body control unit 4B, and the main body control unit 4B turns on the current change-over switch 11a (step S93).

The motor drive device 101E operates as described above with reference to FIG. 13 during motor driving. However, depending on the case, the motor drive device 101E may receive an instruction to change the rotational speed of the motor 13 (rotational-speed change instruction) from the user, and thus change the target rotational speed.

For example, when an instruction to change the rotational speed of the motor 13 is received from the user during an ON state of the current change-over switch 11a, the motor drive device 101E maintains the current change-over switch 11a in an ON state until the rotational speed reaches the target rotational speed that reflects the changing of the rotational speed.

Moreover, the motor drive device 101E may, depending on the case, receive an instruction to change the rotational speed of the motor 13 from the user during an OFF state of the current change-over switch 11a. The operation of the motor drive device 101E in this case, that is, the operation of the motor drive device 101E in a case of reception of an instruction to change the rotational speed of the motor 13 while being stable, is similar to the operation described with reference to FIG. 8 in the first embodiment.

Note that, also in the second embodiment, the main body control unit 4B may turn on the current change-over switch 11a after issuance of a rotational-speed change instruction to the motor drive control unit 7E, or may turn on the current change-over switch 11a simultaneously with issuance of a rotational-speed change instruction to the motor drive control unit 7E, similarly to the first embodiment.

Figure 14:
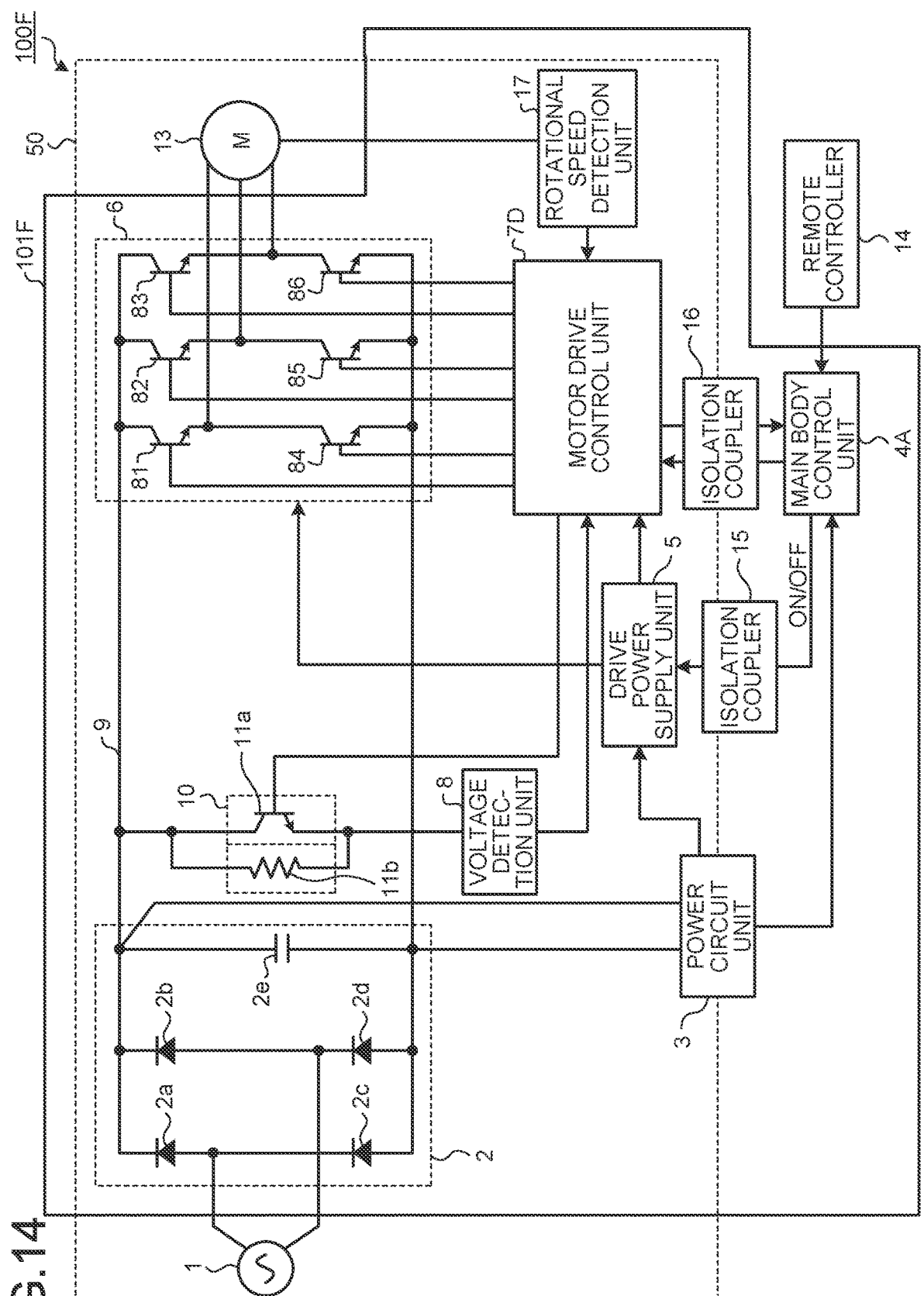
FIG. 14 is a diagram illustrating a third configuration example of the motor drive system including the motor drive device according to the second embodiment.

The main body control unit 4A illustrated in FIG. 10 may be insulated from the portion enclosed by the broken line 50. FIG. 14 is a diagram illustrating a third configuration example of the motor drive system including the motor drive device according to the second embodiment. Of the components in FIG. 14, components that provide the same functionality as the components of the motor drive system 100C illustrated in FIG. 9 or of the motor drive system 100D illustrated in FIG. 10 are designated by like reference characters, and duplicate description thereof will be omitted.

A motor drive system 100F, having an insulated configuration, differs from the motor drive system 100D in including a motor drive device 101F in place of the motor drive device 101D. In addition, the motor drive device 101F includes the isolation couplers 15 and 16 in addition to the components of the motor drive device 101D. The isolation couplers 15 and 16 insulate the main body control unit 4A from the portion enclosed by the broken line 50. The isolation coupler 15 is disposed between the main body control unit 4A and the drive power supply unit 5, and the isolation coupler 16 is disposed between the main body control unit 4A and the motor drive control unit 7D. Thus, insertion of the isolation couplers 15 and 16 between the main body control unit 4A and the components inside the broken line 50, enables the main body control unit 4A to be electrically isolated from the components inside the broken line 50.

Note that the isolation couplers 15 and 16 may also be provided for the motor drive device 101E of FIG. 12. In this case, the isolation coupler 15 will be disposed between the main body control unit 4B and the drive power supply unit 5, and the isolation coupler 16 will be disposed between the main body control unit 4B and the motor drive control unit 7E. Moreover, an isolation coupler will be disposed between the main body control unit 4B and the current change-over switch 11a.

Note that FIG. 14 differs from FIG. 10 in the presence or absence of the isolation couplers 15 and 16, and the operation processing procedure of the motor drive device 101F is similar to the operation processing procedure of the motor drive device 101D illustrated in FIG. 11. Description thereof will therefore be omitted.

As described above, according to the second embodiment, turning off of the current change-over switch 11a when no detection is required with respect to the value of the voltage of the bus 9, enables a current to flow to the voltage detection unit 8 through the current limiting resistor 11b when no detection is required with respect to the value of the voltage of the bus 9. This can reduce power consumption.

Third Embodiment

A third embodiment of this invention will next be described with reference to FIGS. 15 to 17. In the third embodiment, the motor drive systems 100A to 100F are applied to an air conditioner.

Figure 15:
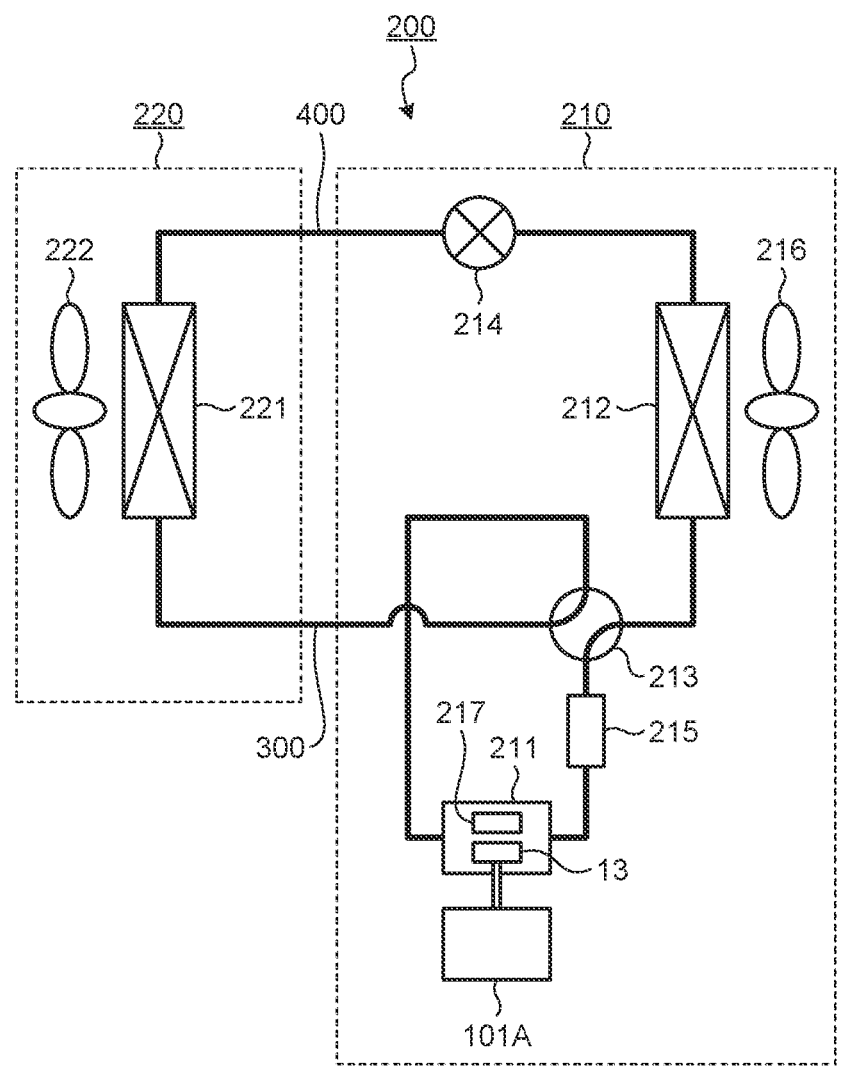
FIG. 15 is a diagram illustrating a configuration example of an air conditioner according to a third embodiment.
Figure 16:
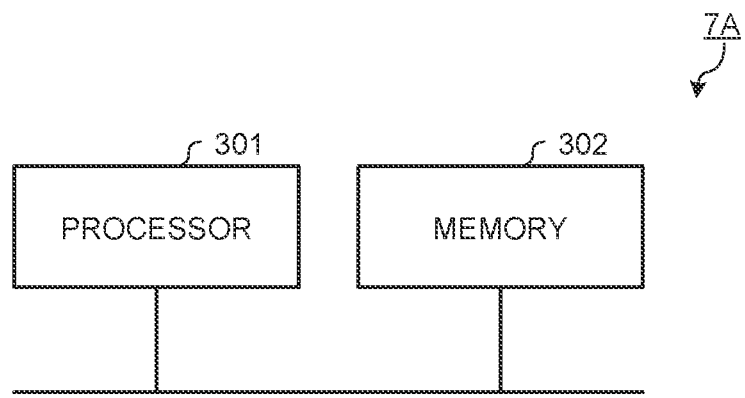
FIG. 16 is a diagram illustrating a first example of the hardware configuration of the motor drive control unit included in the motor drive device according to the first or second embodiment.

FIG. 15 is a diagram illustrating a configuration example of an air conditioner according to the third embodiment. An air conditioner 200 is a device that transfers heat between outdoor air and indoor air via a refrigerant to heat or cool the room to provide air conditioning.

The air conditioner 200 of the third embodiment includes an outdoor unit 210 and an indoor unit 220. In the air conditioner 200, the outdoor unit 210 and the indoor unit 220 together form a refrigeration cycle device. The outdoor unit 210 includes one of the motor drive devices 101A to 101F described in the first or second embodiment. The case will herein be described in which the outdoor unit 210 includes the motor drive device 101A.

The outdoor unit 210 includes the motor drive device 101A, a compressor 211, an outdoor heat exchanger 212, a four-way valve 213, a decompression unit 214, a refrigerant storage unit 215, and a fan 216. The compressor 211 includes a compression mechanism 217 for compressing the refrigerant, and the motor 13 for operating the compression mechanism 217. The indoor unit 220 includes a load-side heat exchanger 221 and a fan 222.

In the air conditioner 200, the outdoor unit 210 and the indoor unit 220 are connected to each other via refrigerant pipes to form a refrigerant circuit, in which the refrigerant circulates. The refrigerant pipes include a gas pipe 300, which is a pipe in which the refrigerant in gas phase flows, and a liquid pipe 400, which is a pipe in which the refrigerant in liquid phase flows. Note that a gas-liquid biphase refrigerant may flow in the liquid pipe 400.

The compression mechanism 217 compresses the incoming refrigerant, and discharges the resulting refrigerant. The refrigerant storage unit 215 stores the refrigerant. The four-way valve 213 switches the flow of the refrigerant between the flow in cooling operation and the flow in heating operation based on an instruction from a control device not illustrated.

The outdoor heat exchanger 212 exchanges heat between the refrigerant and outdoor air. The outdoor heat exchanger 212 functions as an evaporator during heating operation, and thus exchanges heat between the refrigerant at a lower pressure flowed in through the liquid pipe 400 and outdoor air thus to evaporate and gasify the refrigerant. The outdoor heat exchanger 212 functions as a condenser during cooling operation, and thus exchanges heat between the refrigerant flowed in from the four-way valve 213 side, compressed by the compression mechanism 217, and outdoor air thus to condense and liquefy the refrigerant.

To improve the efficiency of heat exchanging between the refrigerant and outdoor air, the outdoor heat exchanger 212 is provided with the fan 216. The decompression unit 214 adjusts the pressure of the refrigerant by changing the opening degree.

The load-side heat exchanger 221 exchanges heat between the refrigerant and indoor air. The load-side heat exchanger 221 functions as a condenser during heating operation, and thus exchanges heat between the refrigerant flowed in through the gas pipe 300 and indoor air thus to condense and liquefy the refrigerant, and then allows the refrigerant to flow out toward the liquid pipe 400. The load-side heat exchanger 221 functions as an evaporator during cooling operation, thus exchanges heat between the refrigerant depressurized by the decompression unit 214 and indoor air to allow heat to be transferred from air to the refrigerant thus to gasify the refrigerant. The load-side heat exchanger 221 then allows the resulting refrigerant to flow out toward the gas pipe 300. The fan 222 adjusts the flow of air to be subjected to heat exchanging performed by the load-side heat exchanger 221.

The air conditioner 200 determines the operation mode and the amount of heat to be exchanged required in the refrigeration cycle, in response to user operation using the remote controller 14 or the like. In this operation, the outdoor unit 210 determines the rotational speed of the compression mechanism 217, the operation of the four-way valve 213, and the rotational speed of the fan 216, in response to the operation on the remote controller 14; and the indoor unit 220 determines the rotational speed of the fan 222. The rotational speed of the compression mechanism 217 is determined by the motor drive device 101A.

Turning off of the current change-over switch 11a by the motor drive device 101A when no detection is required with respect to the value of the voltage of the bus 9, enables a current to flow to the voltage detection unit 8 through the current limiting resistor 11b when no detection is required with respect to the value of the voltage of the bus 9. Thus, the air conditioner 200 can reduce power consumption.

A hardware configuration of the motor drive control units 7A, 7B, 7D, and 7E will now be described. FIG. 16 is a diagram illustrating a first example of the hardware configuration of the motor drive control units included in the motor drive devices according to the first or second embodiment. Due to the similar hardware configuration of the motor drive control units 7A, 7B, 7D, and 7E, a hardware configuration of the motor drive control unit 7A will herein be described.

The functionality of part or all of the components included in the motor drive control unit 7A can be implemented by a processor 301 and a memory 302.

Examples of the processor 301 include a central processing unit (CPU) (also known as a processing unit, a computing unit, a microprocessor, a microcomputer, a processor, and a digital signal processor (DSP)) and a system large scale integration (LSI). Examples of the memory 302 include a random access memory (RAM) and a read-only memory (ROM).

The motor drive control unit 7A is implemented by the processor 301 by reading and executing a control program, stored in the memory 302, for performing operation of the motor drive control unit 7A. It can also be said that this control program causes a computer to perform a procedure or method of the motor drive control unit 7A. The memory 302 is also used as a temporary memory when the processor 301 performs various processing tasks.

Figure 17:
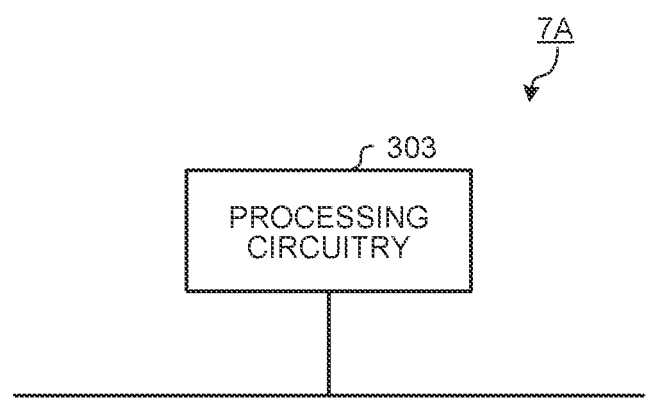
FIG. 17 is a diagram illustrating a second example of the hardware configuration of the motor drive control unit included in the motor drive device according to the first or second embodiment.

FIG. 17 is a diagram illustrating a second example of the hardware configuration of the motor drive control units included in the motor drive devices according to the first or second embodiment. The functionality of part or all of the components included in the motor drive control unit 7A can be implemented by processing circuitry 303.

The processing circuitry 303 is a dedicated hardware element. The processing circuitry 303 is, for example, a single circuit, a set of multiple circuits, a programmed processor, a parallel programmed processor, an application specific integrated circuit (ASIC), a field-programmable gate array (FPGA), or a combination thereof.

Note that the functionality of the motor drive control unit 7A may be partially implemented by a dedicated hardware element, and partially implemented by software or firmware. That is, the functionality of the motor drive control unit 7A may be implemented such that a part of the functionality is implemented by the processor 301 and the memory 302 illustrated in FIG. 16, and the remainder of the functionality is implemented by the dedicated processing circuitry 303 illustrated in FIG. 17.

Note that the main body control units 4A and 4B described in the first or second embodiment have a hardware configuration similar to the hardware configuration of the motor drive control unit 7A, and description thereof will therefore be omitted.

The configurations described in the foregoing embodiments are merely examples of various aspects of the present invention. These configurations may be combined with a known other technology, and moreover, a part of such configurations may be omitted and/or modified without departing from the spirit of the present invention.

The invention claimed is:

1. A motor drive device comprising:
a supply power generator to convert electrical power supplied from a commercial power supply, into direct current electrical power;
an inverter output circuit to drive a motor using electrical power supplied from the supply power generator;
a voltage detector to detect a voltage value of a direct current voltage being applied to the inverter output circuit by the supply power generator;
a current detector to detect a current value of a current being supplied from the inverter output circuit to the motor;
a current limiting resistor and a current change-over switch connected in parallel between a bus and the voltage detector, the bus connecting the supply power generator and the inverter output circuit to each other, wherein the current change-over switch switches a short circuit path between both ends of the current limiting resistor to either an ON state or an OFF state; and
first processing circuitry to control the inverter output circuit based on a detection result of the voltage detector and to control turning on and off of the current change-over switch based on the current value, wherein the first processing circuitry
transmits a voltage of the bus to the voltage detector through the current change-over switch by turning on the current change-over switch when the motor is to be driven, and
transmits the voltage of the bus to the voltage detector, not through the current change-over switch, but through the current limiting resistor, by turning off the current change-over switch when the current value changes only by an amount less than a first threshold in a first time period during driving of the motor.

2. The motor drive device according to claim 1, wherein
the current detector periodically detects the current value during driving of the motor after the current change-over switch is turned off, and
the first processing circuitry stores a current value obtained by the periodical detecting by the current detector, and when the current value obtained by the periodical detecting by the current detector changes by an amount greater than or equal to a second threshold in a second time period, turns on the current change-over switch.

3. The motor drive device according to claim 1, wherein
upon reception, during driving of the motor, of an instruction to change a rotational speed of the motor, the first processing circuitry turns on the current change-over switch when the current change-over switch is in an OFF state.

4. The motor drive device according to claim 1, further comprising:
second processing circuitry, connected to the current change-over switch, to transmit a signal to the first processing circuitry based on an instruction from a user, wherein
the first processing circuitry causes the second processing circuitry to provide control of turning on and off of the current change-over switch, instead of the first processing circuitry turning on and off the current change-over switch.

5. An air conditioner comprising:
the motor drive device according to claim 1; and
a compressor comprising a motor to be driven by the motor drive device.

6. The motor drive device according to claim 1, wherein
the first processing circuitry is configured to turn off the current change-over switch regardless of whether the motor has been or is being instructed to turn off.

7. A motor drive device comprising:
a supply power generator to convert electrical power supplied from a commercial power supply, into direct current electrical power;
an inverter output circuit to drive a motor using electrical power supplied from the supply power generator;
a voltage detector to detect a voltage value of a direct current voltage being applied to the inverter output circuit by the supply power generator;
a rotational speed detector to detect a rotational speed of the motor;

a current limiting resistor and a current change-over switch connected in parallel between a bus and the voltage detector, the bus connecting the supply power generator and the inverter output circuit to each other, wherein the current change-over switch switches a short circuit path between both ends of the current limiting resistor to either an ON state or an OFF state; and a first processing circuitry to control the inverter output circuit based on a detection result of the voltage detector and to control turning on and off of the current change-over switch based on the rotational speed, wherein the first processing circuitry transmits a voltage of the bus to the voltage detector through the current change-over switch by turning on the current change-over switch when the motor is to be driven, and transmits the voltage of the bus to the voltage detector, not through the current change-over switch, but through the current limiting resistor, by turning off the current change-over switch when the rotational speed changes only by an amount less than a first threshold in a first time period during driving of the motor.

8. The motor drive device according to claim 7, wherein the rotational speed detector periodically detects the rotational speed during driving of the motor after the current change-over switch is turned off, and the first processing circuitry stores a rotational speed obtained by the periodical detecting by the rotational speed detector, and when the rotational speed obtained by the periodical detecting by the rotational speed detector changes by an amount greater than or equal to a second threshold in a second time period, turns on the current change-over switch.

9. The motor drive device according to claim 7, wherein upon reception, during driving of the motor, of an instruction to change a rotational speed of the motor, the first processing circuitry turns on the current change-over switch when the current change-over switch is in an OFF state.

10. The motor drive device according to claim 7, further comprising:

second processing circuitry, connected to the current change-over switch, to transmit a signal to the first processing circuitry based on an instruction from a user, wherein the first processing circuitry causes the second processing circuitry to provide control of turning on and off of the current change-over switch, instead of the first processing circuitry turning on and off the current change-over switch.

11. An air conditioner comprising:

the motor drive device according to claim 7; and a compressor comprising a motor to be driven by the motor drive device.

12. The motor drive device according to claim 7, wherein the first processing circuitry is configured to turn off the current change-over switch regardless of whether the motor has been or is being instructed to turn off.

\* \* \* \* \*